(12) United States Patent
Queralt et al.

(10) Patent No.: US 11,431,509 B2
(45) Date of Patent: *Aug. 30, 2022

(54) BRIDGING DIGITAL IDENTITY VALIDATION AND VERIFICATION WITH THE FIDO AUTHENTICATION FRAMEWORK

(71) Applicant: Queralt, Inc., New Haven, CT (US)

(72) Inventors: Michael Queralt, White Plains, NY (US); Daniel R. Sabia, Glastonbury, CT (US)

(73) Assignee: Queralt, Inc., New Haven, CT (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/122,631

(22) Filed: Dec. 15, 2020

(65) Prior Publication Data

US 2021/0194703 A1    Jun. 24, 2021

Related U.S. Application Data

(63) Continuation-in-part of application No. 15/819,605, filed on Nov. 21, 2017, now Pat. No. 10,887,113,
(Continued)

(51) Int. Cl.
*H04L 9/32* (2006.01)
*H04L 9/40* (2022.01)
*G06F 21/64* (2013.01)

(52) U.S. Cl.
CPC ............ *H04L 9/3263* (2013.01); *G06F 21/64* (2013.01); *H04L 63/0853* (2013.01);
(Continued)

(58) Field of Classification Search
CPC . H04L 9/3268; H04L 9/30; H04L 9/14; H04L 9/006; H04L 2209/80
See application file for complete search history.

(56) References Cited

U.S. PATENT DOCUMENTS

2005/0239441 A1    10/2005 Eronen
2011/0126002 A1    5/2011 Fu et al.
(Continued)

FOREIGN PATENT DOCUMENTS

| JP | 2005149341 A | 6/2005 |
|---|---|---|
| JP | 2009020783 A | 1/2009 |
| KR | 101611872 B1 | 4/2016 |

OTHER PUBLICATIONS

"FIDO Alliance White Paper: Leveraging FIDO Standards to Extend the PKI Security Model in United States Government Agencies", FIDO Alliance. 2013 https://fidoalliance.org/wp-content/uploads/White-Paper-Leveraging-FIDO-Standards-to-Extend-the-PKI-Security-Model-in-US-Govt-Agencies.pdf.
(Continued)

*Primary Examiner* — Mohammed Waliullah
(74) *Attorney, Agent, or Firm* — St. Onge Steward Johnston and Reens LLC

(57) ABSTRACT

A system and method for integrating FIDO authentication systems and User verification systems. The system is provided in one configuration as a mobile app that allows access to highly sensitive information via a mobile device while simultaneously ensuring a highly secured environment authenticating both the mobile device and the user via a highly reliable authentication process.

40 Claims, 15 Drawing Sheets

Related U.S. Application Data which is a continuation-in-part of application No. 15/703,138, filed on Sep. 13, 2017, now abandoned.

(60) Provisional application No. 62/393,893, filed on Sep. 13, 2016.

(52) U.S. Cl.
CPC ........ H04L 63/0884 (2013.01); H04L 9/3247 (2013.01); H04L 9/3297 (2013.01); H04L 63/166 (2013.01)

(56) References Cited

U.S. PATENT DOCUMENTS

| | | | |
|---|---|---|---|
| 2013/0042314 A1 | 2/2013 | Kelley | |
| 2013/0132717 A1 | 5/2013 | Brand et al. | |
| 2013/0133086 A1 | 5/2013 | Liberman et al. | |
| 2014/0020073 A1 | 1/2014 | Ronda et al. | |
| 2015/0007299 A1 | 1/2015 | Grajek et al. | |
| 2015/0019863 A1 | 1/2015 | Tu et al. | |
| 2015/0134967 A1* | 5/2015 | Moore | H04L 9/3263 713/175 |
| 2015/0156024 A1 | 6/2015 | De Los Santos et al. | |
| 2015/0341332 A1 | 11/2015 | Smith et al. | |
| 2015/0348026 A1 | 12/2015 | Roberts et al. | |
| 2016/0036794 A1 | 2/2016 | Adhya et al. | |
| 2016/0080381 A1 | 3/2016 | Hall | |
| 2017/0034168 A1 | 2/2017 | Wilson et al. | |
| 2017/0070353 A1 | 3/2017 | Suwirya et al. | |
| 2018/0075231 A1* | 3/2018 | Subramanian | G06F 21/41 |
| 2019/0140844 A1 | 5/2019 | Brown et al. | |
| 2019/0190723 A1* | 6/2019 | Lee | H04L 9/3231 |
| 2019/0245699 A1 | 8/2019 | Irwan et al. | |

OTHER PUBLICATIONS

International Search Report and Written Opinion; Application No. PCT/US2018/054670; dated Dec. 14, 2018; 10 pages.

NIST SP 800-63-3 Digital Identity Guidelines https://pages.nist.gov/800-63-3/sp800-63-3.html. Jun. 2017.

"Merging FIDO and PIV could help feds achieve strong authentication goals". SecureID News, Mar. 17, 2017 https://www.secureidnews.com/news-item/merging-fido-and-piv-could-help-feds-achieve-strong-authentication-goals/.

Solution Group. "SOS FIDO V1 .1 Security Target Lite," Copyrigght © 2015 Samsung 1-35 SOS Co, Sep. 2, 2015, [retrieved on Nov. 28, 2018]. Retrieved from the Internet: <URL: https://www.commoncriteriaportal.org/files/epftles/SDS%20FIDO%20V1.1-ASE-V2.0_Lite_Eng.pdf> pp. 1-59.

Srinivas et al.; "FIDO UAF Architectural Overview"; Dec. 8, 2014; Retrieved from Internet: URL:https://fidoalliance.org/specs/fido-uaf-v1.0-ps-20141208/fido-uaf-overview-v1.0-ps-20141208.pdf (retrieved on Nov. 2, 2016).

* cited by examiner

BRIDGING DIGITAL IDENTITY VALIDATION AND VERIFICATION WITH THE FIDO AUTHENTICATION FRAMEWORK

FIELD OF THE INVENTION

The application is directed to security of resources that are processed on a mobile device. In particular, it is directed to a registration and an authentication system for securely handling sensitive data utilizing a mobile device.

BACKGROUND OF THE INVENTION

Registration and authentication systems have been in wide use for a long time. Some of the earliest authentication systems used to identify the individual seeking access to a computer or service include the use of a simple password that is associated with a user. The individual enters a password and is then given access to information that is properly associated with the individual. It is understood that different individuals have different access levels.

A primary problem with this type of system is that passwords are notoriously unreliable when it comes to security. There has been a host of other approaches to user authentication including the use of imaging software to visually identify the person seeking access to a computer or service, or the use of biometrics to identify a person (e.g., finger print, eye scan, etc.). Still further problems observed with password-based systems include catastrophic Denial of Service attacks being perpetrated by Internet of Things (IoT) botnets that exploit default passwords on everyday devices.

When there is a need for strongly vetted credentials to authenticate an individual seeking access to a service or computer, Public Key Infrastructure (PKI) has been effectively used. PKI provides a strong proof of identity by utilizing the following key components to its architecture:

1. Digital certificates. Digital "identities" issued by trusted third parties that identify users and machines. They may be securely stored in wallets or in directories.
2. Public and private keys. These form the basis of PKI for secure communications, based on a secret private key and a mathematically related public key.
3. Certificate Authority (CA). Acts as a trusted, independent provider of digital certificates.

PKI provides very strongly vetted credentials. As PKI is such a strong standard, it has been used extensively in the information security area to deliver identity authentication for multiple areas, including to individuals, organizations and machines. By using Public keys that are bound to the identity and providing a mechanism to gain access to information about the organization that created the certificate and allowing the individual to control its private key, PKI provides the capabilities for a relying party application to reach back to the originating source of the identity. This approach provides a relying party a high level of confidence on the ownership of the presented identity, which is enhanced when the originating source is a validated and trusted entity (e.g., the U.S. Government).

To complicate matters, a strong trend is being seen in all sectors of the economy, for fixed computers to be replaced by mobile devices for convenience, flexibility, and accessibility. Furthermore, a diverse identity management ecosystem is being developed, where certificate authorities are decoupled from application providers, users are mobile and companies are struggling to understand who is seeking to access their systems. Mobility—being un-tethered to a physical workplace—brings enormous work and work flow efficiencies, and, if implemented carefully, benefits employers and employees alike. Mobile computing is introducing newer architectures, breaking down silos, and introducing peer to peer transactions between multiple and unrelated parties relying on trust to perform such transactions. Mobile computing is changing the way that people work and do business. For example, in the past, if a person wanted to access highly secure documents they would have to sit at a secure terminal and log in through a series of operations that confirmed that the individual could have access to that information. However, with the advancement in mobile devices allowing for a much greater amount of work to be performed on them, pressure has mounted to allow individuals to access highly sensitive information with their mobile device.

Mobile devices have brought a rapid convergence of multi-factor authentication, native functionality (i.e. apps), and web browsing. One of the most important recent advances is the use of the phone-as-second-factor for identification purposes. That is, the cell phone (or mobile device) is the "something you have". The overt physical factor is activated by a Personal Identification Number (PIN) or password (the something you know), or increasingly, an integrated biometric or a combination of those elements.

A strong identity proofing solution like, Personal Identity Verification (PIV), has been primarily deployed on smartcards. Classically, PIV credentials are carried on smartcards which contain secure private keys. Likewise, until now, interoperability of PIV credentials required specific PKI integration of client-side software components and the back-end CA. The government has struggled to use PIV cards with mobile devices as, among other things, many mobile devices lack traditional smart card readers, and efforts to leverage NFC for mobile authentication have struggled. In part because of these challenges, the U.S. government crafted the Derived PIV Credential (DPC) initiative—focused on extending the security model of PKI to mobile devices. While launched in 2014, DPC is still in early adoption mode and has proven very complex to deploy. In practice, this means that millions of mobile devices across the U.S. government are not protected with strong authentication.

Private sector enterprises face similar demands as the various U.S. government agencies to open access to secure content from users' mobile devices. Consider the aerospace and defense industry as an example. Every company in this industry has made a significant financial investment in SmartCard technologies to provide their users, suppliers, and in some cases, even customers with strongly vetted x.509 identity credentials.

Current trends in identity and access emphasis the need for trusted digital identities for an individual to electronically prove their identity. As a result there is a global increase in government issued digital identities including a set of digital attributes and credentials to uniquely identify an individual on line or offline in the digital world. With specific credentials, digital identities can be used to authenticate its owner.

X.509 is a standard used by PKI to manage digital certificates and public-key encryption and a key part of the Transport Layer Security protocol used to secure web and email communication. An X.509 certificate is a digital certificate that uses the international X.509 PKI standard to verify that a public key belongs to the user, computer or service identity contained within the certificate.

These private sector enterprise users that access confidential data with mobile devices have become increasingly reliant on smartphones and tablets to get their day-to-day work done. However, data owners in these organizations have been hesitant to provide access to very highly sensitive information from mobile devices, due to security concerns (starting with authentication).

While PKI has been and continues to be a highly secure centralized system for verifying user identity, other decentralized systems that utilize many of the same concepts of PKI are being developed including, for example, Verifiable Claims in which Decentralized Identifiers (DID's), a new type of identifier that enables verifiable, decentralized digital identity are used to identify different subjects (e.g., a person, organization, thing, data model, abstract entity, etc.) In contrast to typical, federated identifiers, DIDs have been designed so that they may be decoupled from centralized registries, identity providers, and certificate authorities.

The result of all this mobile device utilization has been the proliferation of new and differing types of authentication systems. These relatively new authentication systems provide various benefits including for example, the ability to leverage key functions of mobile devices and new computing technics to deliver a more user friendly and frictionless authentication process between the mobile device and the relying party (e.g., the organization providing a service to the individual, device or other).

A potent combination of security factors plus widespread native cryptography has propelled the Fast Identity Online (FIDO) Alliance to transform authentication from essentially any mobile device. FIDO is a consortium of identity management vendors, product companies and service providers working on strong authentication standards using industry standard, tested and vetted cryptographic algorithms. FIDO standards are enabling a new paradigm for multi-factor authentication: once an individual has authenticated to their personal mobile device, they should be able to use that device to then authenticate to other digital services. The FIDO Alliance has published three sets of specifications for simpler, stronger authentication: FIDO Universal Second Factor (FIDO U2F), FIDO Universal Authentication Framework (FIDO UAF) and the Client to Authenticator Protocols (CTAP). CTAP is complementary to the W3C's Web Authentication (WebAuthn) specification; together, they are known as FIDO2. FIDO2 enables users to leverage common devices to easily authenticate to online services in both mobile and desktop environments.

The publication of NIST SP 800-63-3 DIGITAL IDENTITY GUIDELINES outlined notable changes in the identity proofing and authentication of users, such as employees, contractors, private individuals, and commercial entities, working with government IT systems over open networks. See, https://pages.nist.gov/800-63-3/sp800-63-3.html. Two significant changes outlined in the document are (1) the separation of identity assurance from authenticator assurance, and (2) the recognition of technologies like FIDO within the highest level—Authenticator Assurance Level 3 (AAL3).

As a result, the FIDO protocol is now considered a viable option, as it meets government guidelines for asymmetric, public-key (PK) cryptography for authentication. This will lead to strong mobile authentication to FIDO enabled legacy and cloud based applications and resources that were previously too difficult and or expensive to PKI enable.

One of the limitations of mobile device authentication systems such as FIDO, is the inability to directly integrate with user verification systems such as PKI, which securely manages identity credentials and verifies the identity of a user back to a trusted party prior to authentication. This results in the inability to directly use government standard identification credentials with AA3 level authentication provided by FIDO.

For example, the Article entitled "FIDO Alliance White Paper: Leveraging FIDO Standards to Extend the PKI Security Model in United States Government Agencies" published by the FIDO Alliance describes how FIDO can complement PKI in expanding the U.S. Governments authentication ecosystem. https://fidoalliance.org/wp-content/uploads/White-Paper Leveraging-FIDO-Standards-to-Extend-the-PKI-Security-Model-in-US-Govt-Agencies.pdf. The paper details the challenges and shortcomings with PKI but acknowledges that PIV should continue as the U.S. Governments credential of choice.

Another article is provided by SecureID News dated Mar. 17, 2017 entitled "Merging FIDO and PIV could help feds achieve strong authentication goals". https://www.secureidnews.com/news-item/merging-fido-and-piv-could-help-feds-achieve-strong-authentication-goals/ This article summarizes the above-referenced white paper. Some key excerpts include: "PKI enabling applications—both legacy and new—is not an easy process" and "If full-blown PIV card presentment were doable, that would be the preferred route. But in cases where this is not possible, PIV derived credentials would be next followed by FIDO derived credentials." In other words, the PKI system cannot currently be fully merged with the FIDO world.

Accordingly, this is a problem that the industry is currently dealing with, namely, how to utilize the strongly vetted credentials provided by a system, such as, PKI, along with strong authentication standards using industry standard, tested and vetted cryptographic algorithms, such as, FIDO. As noted in the above-referenced articles, there is no effective solution that has yet been achieved.

SUMMARY OF THE INVENTION

What is desired then is a system and method that provides for strong authentication of an individual seeking to access highly sensitive information via a mobile device.

It is further desired to provide a system and method that bridges between highly reliable user verification systems and highly reliable mobile device authentication systems.

It is still further desired to provide a system and method that allows digital credentials on a mobile device to be verified with a highly reliable user verification system and allows that same identity to be subsequently vetted with a highly reliable mobile device authentication system which utilizes the vetting of the user verification system.

It is also desired to provide a system and method that bridges between a PKI authentication system and a FIDO authentication system for a mobile device such that the FIDO authentication system uses and relies on the validation and verification of identity provided by the PKI authentication system.

It is also desired to provide a system and method that bridges between newer formats of decentralized identity verification systems including DID's such that the FIDO authentication system uses and relies on the validation and verification of identity provided by the DID authentication system.

Accordingly, in one configuration, a system is provided that bridges the format of FIDO public key cryptography with the Certificate Authority based format of PKI.

A primary benefit of PKI is that it comprises a strong standard that has been extensively used in the information security area to deliver identity authentication for multiple areas, including individuals, organizations and machines. PKI is considered a very strong standard because it uses public keys that are bound to the identity. Additionally, PKI provides a mechanism to access information about the organization that created the certificate. PKI allows for a relying party application to "reach back" through a continuous chain to the originating source of the identity. This provides a relying party a very high level of confidence on the ownership of the presented identity, which is enhanced when the originating source is a validated and highly trusted entity.

A key component of the PKI approach is a validated digital certificate in the x.509 format, which usually contains the following informational attributes that can be provided to the identity owner in many ways (e.g., soft or hard token), and usually contains the following core information: 1) The certificate user's name; 2) an expiration date; 3) a unique serial number assigned to the certificate by the CA; 4) the user's public key; 5) information about the rights and uses associated with the certificate; 6) the name of the certificate authority that issued the certificate; 7) the CA's signature; and 8) an algorithm identifier that identifies which algorithm was used to sign the certificate.

The certificate becomes an electronic document that can be used to validate the identity of the individual or device that owns the certificate and delivers a highly trusted response to the relying parties (i.e., because it is possible to track a continuous chain back to the originating source). However, there is a major challenge of extending this type of system into mobile devices. This is because of relatively high computing requirements, and the propensity of PKI in sharing user and private information to the relying parties as they gain access to the certificate and its information.

As previously mentioned, another format that can be used to provide strong user identity is a Decentralized Identity model that employs a Decentralized Identifier Document. Decentralized identities use digital documents DID that are used in a decentralized architecture (e.g., blockchain, self-sovereign identity and other decentralized assertion models) to provide a method to a verifiable identity in a decentralized architecture for individuals or devices. Decentralized identifiers are a type of identifier that enables a verifiable, decentralized digital identity. They are based on the Self-sovereign identity paradigm. A DID identifies any subject (e.g., a person, organization, thing, data model, abstract entity, etc.) that the controller of the DID decides that it identifies. These identifiers are designed to enable the controller of a DID to prove control over it and to be implemented independently of any centralized registry, identity provider, or certificate authority. DIDs are URLs that associate a DID subject with a DID document allowing trustable interactions associated with that subject. Each DID document can express cryptographic material, verification methods, or service endpoints, which provide a set of mechanisms enabling a DID controller to prove control of the DID. Service endpoints enable trusted interactions associated with the DID subject. A DID document could contain the DID subject itself, pubic keys for verification, authentication methods, a set of service end points for interaction, a time stamp for audit purposes and a signature to check the integrity of the document.

FIDO protocols on the other hand, use standard public key cryptography techniques to provide strong and secure authentication between a device and a relying party (e.g., an online service). The FIDO protocol comprises: 1) Registration; 2) Authentication; 3) Transaction confirmation; and 4) Deregistration.

The FIDO registration process typically proceeds as follows:

First, a user is prompted to choose an available FIDO authenticator that matches an online service's acceptance policy.

Second, the user unlocks the FIDO authenticator using some user gesture such as swiping a fingerprint reader, securely entering a PIN or using some other trusted method.

Third, the user's authenticator creates a new public/private key pair unique for the authenticator, the online service and user's account.

Fourth, the public key is sent to the online service and associated with the user's account. It should be noted that the private key and any information about the local authentication method never leave the local device.

A key benefit is that with FIDO, agencies and commercial relying party applications will be able to achieve the security benefits of public key cryptography without the traditional and costly CA model.

A limitation of the FIDO registration and authentication process, however, is that each assumes that the identity of the authenticator owner without strong validation or verification. Since PKI and DID each provide a path for a verifiable source of identity (e.g., electronic documents that can be validated and/or verified), it would be good to utilize either PKI or DID and FIDO to verify the identity of a user that is seeking to access data using a mobile device. It should be noted that the terms "verification", "verified", "validation" and "validated" are interchangeably used throughout the application. The Mobile Authentication Interoperability for Digital Certificates (MAIDC) system as described herein does just this.

The MAIDC system joins digital credentials to FIDO enabled backend services. In one configuration, the MAIDC system comprises a mobile authentication app that controls access to and the use of Derived PIV Credentials (DPC) or a DID document on users' mobile devices (e.g., phones, tablets, etc.). The system also provides for FIDO authentication methods, which are utilized to obtain access to electronic resources.

In particular, in one configuration a FIDO certified Derived Credential (x.509) authenticator will act as a bridge between credentials issued by a Certificate Authority and stored securely on a user's mobile device and enterprise web resources, via the FIDO UAF protocol.

With FIDO protocols being increasingly accepted by commercial and government servers, the authenticator using trusted identifications could enable, for instance, NIST SP 800-63-3 AAL3 mobile authentication utilizing IAL3 identities for first responders to emergency response management partners, energy utilities, healthcare facilities, and financial entities, while safeguarding the privacy of the individual, and extending the value of the credential to be used in a diverse range of authentication activities.

MAIDC in one configuration utilizes DPC, which provide for PIV certificates to be mirrored into compatible mobile devices. This means that an exact copy is not saved to the compatible mobile device, rather, a parallel identification certificate is utilized. So the certificate is not copied from the card itself, rather, it is copied from another location, meaning the issuer value is different, but includes similar data (e.g., same email, same name, etc.) utilizing digital certificates to convey that information in a standardized way. In access control settings, the digital certificate is presented to a server, parsed, and the attributes retrieved and consumed by the receiving application. This allows for a new translation capability and resource that maps PIV attributes from derived credentials onto FIDO attributes.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "device" as used herein means any system that facilitates electronic communication. This may include, for example, a mobile phone, pager, email system, computer, tablet, app, smart phone, personal smart device, wearable technology, a laptop, machine intelligence such as, the Internet of Things (IoT). Often, the communications medium will relate to an application on a device.

The terms "user" or "users" mean a person or persons, machine or program respectively, who access data in any manner, whether alone or in one or more groups, whether in the same or various places, and whether at the same time or at various different times.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", "connected with" and "connection" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

The terms "public key infrastructure" and "PKI" as used herein is a set of roles, policies, and procedures needed to create, manage, distribute, use, store, and revoke digital certificates and manage public-key encryption.

The terms "Fast Identity On Line Alliance" and "FIDO" as used herein is a protocol that uses standard public key cryptography techniques to provide authentication between a device and a relying party and includes: Registration, Authentication, Transaction confirmation, and Deregistration.

The term "Decentralized Identifier Document (DID)" as herein is a document that contains the DID subject itself, pubic keys for verification, authentication methods, a set of service end points for interaction, a time stamp for audit purposes and a signature to check the integrity of the document.

In one example a system is provided for authenticating a mobile device seeking to access a server of an online service via a network connection and seeking authentication from a first authentication server and a second authentication server, where the system comprises a mobile app associated with the online service stored on a storage on the mobile device. The system is provided such that when the mobile app is opened, a request to access the online service is generated, the request including data associated with the mobile device and the mobile device transmits the request to an online service server associated with the online service. The system is further provided such that the online service server receives the request to access the online service and generates a first authentication request that is transmitted to the first authentication server, the first authentication request including data being associated with the mobile device. Still further, the system is provided such that the first authentication server receives the first authentication request and generates a first authentication based in part, on the data associated with the mobile device, and the first authentication server transmits the first authentication to the online service server. The system also provides for the online service server generating a proof of identity request, which is transmitted to the mobile device, where the mobile device generates a second authentication request that is transmitted to a second authentication server, the second authentication request including data associated with the user of the mobile device. The system additionally facilitates the second authentication server receiving the second authentication request and generates a second authentication based in part, on the data associated with the user of the mobile device, and the second authentication server transmits the second authentication to the mobile device. The mobile device transmits the second authentication to the online service server, and the online service server allows the mobile device to access the online service via the online service server based on the first authentication and the second authentication.

In another example a method is provided for authenticating a user and a mobile device having a network connection seeking to access a server of an online service via a mobile app, where the online service server seeks authentication from a first authentication server and a second authentication server. The method comprising the steps of opening the mobile app and generating a request to access the online service server, the request including data associated with the mobile device and transmitting the request to the online service server associated with the online service via the network connection. The method further comprises the steps of generating a first authentication request including data associated with the mobile device, transmitting the first authentication request from the online service server to the first authentication server, generating a first authentication based in part, on the data associated with the mobile device, and transmitting the first authentication from the first authentication server to the online service server. The method still further comprises the steps of generating a proof of identity request, transmitting the proof of identity request from the online service server to the mobile device, generating a second authentication request including data associated with the user of the mobile device, and transmitting the second authentication request from the mobile device to the second authentication server. Finally, the method comprises the steps of generating a second authentication based in part, on the data associated with the user of the mobile device, transmitting the second authentication from the second authentication server to the mobile device, transmitting the second authentication from the mobile device to the online service server, and processing the first and second authentications such that access to the online service is provided to the mobile device via the online service server.

In still another example a method for registering a user and a mobile device having a network connection, the user seeking access to an online service associated an app stored on a storage on the mobile device is provided. The method comprises the steps of initiating the app on the mobile device, prompting the user to enter identification information associated with the user and verifying the identification information. The method further comprises the steps of transmitting a registration request from the mobile device to a first authentication server, transmitting the registration notice from the app to an online service server associated with the online service and transmitting a registration signal from the online service server to the mobile device, the registration signal including data associated with the online service. The method also comprise the steps of transmitting a verification request from the app to a second authentication server, the verification request including data associated with the mobile device and the user, transmitting verification data from the second authentication server to the app that verifies the data included in the verification request and includes data associated with the second authentication server and transmitting the verification data from the app to the online service server and to the first authentication server. Finally, the method includes the steps of storing at least some of the verification data on a storage associated with the first authentication server, transmitting a verification result to the app and notifying the user of the registration result.

In yet another example a system for a peer-to-peer authentication of a user with a mobile device to an online service server via a network connection based on reliable information about the user and the mobile device is provided, the system comprising: a memory and a processor, and a software executing on the mobile device transmitting an authentication request to the online service server via a network connection. The system is provided such that the online service server transmits data relating to the authentication request to a Fast Identity Online (FIDO) authentication system via the network connection, and the software receives an authentication request from the FIDO authentication system via the network connection. The system is further provided such that the software retrieves information associated with a digital document comprising data related to the user and stored on the mobile device, the digital document generated via a user verification system, where the retrieved information is selected from the group consisting of: a user verification system digital signature, a user name, an email address, an expiration date, data about rights and uses associated with the digital document, a name of the verification system that generated the digital document, an algorithm identifier that identifies an algorithm that was used to sign the digital document and combinations thereof. The system is still further provided where the software is provided for validation of the integrity of the digital document, and inserts information about the mobile device into an authentication message and transmitting the authentication message to the FIDO authentication system.

In still another example a method for peer-to-peer authentication of a user with a mobile device to an online service server via a network connection based on reliable information about the user and the mobile device is provided, the method comprising the steps of:

transmitting information about the user from the mobile device to a user verification system via a network connection, receiving at the mobile device a digital document containing information about the user from the user verification system and transmitting an authentication request from the mobile device to the online service server via a network connection. The method further comprises the steps of: transmitting data relating the authentication request from the online service server to a Fast Identity Online (FIDO) authentication system via a network connection, receiving at the mobile device an authentication request from the FIDO authentication system, and retrieving information associated with the user from the digital document stored on the mobile device. The method is provided such that the retrieved information is selected from the group consisting of: a user verification system signature, a user name, an email address, an expiration date, data about rights and uses associated with the digital document, a name of the verification system that generated the digital document, an algorithm identifier that identifies an algorithm that was used to sign the digital document and combinations thereof. The method still further comprises the steps of: validating the integrity of the digital document, and inserting information about the mobile device into an authentication message and transmitting the authentication message to the FIDO authentication system.

Other objects of the invention and its particular features and advantages will become more apparent from consideration of the following drawings.

DETAILED DESCRIPTION OF THE INVENTION

Figure 1:
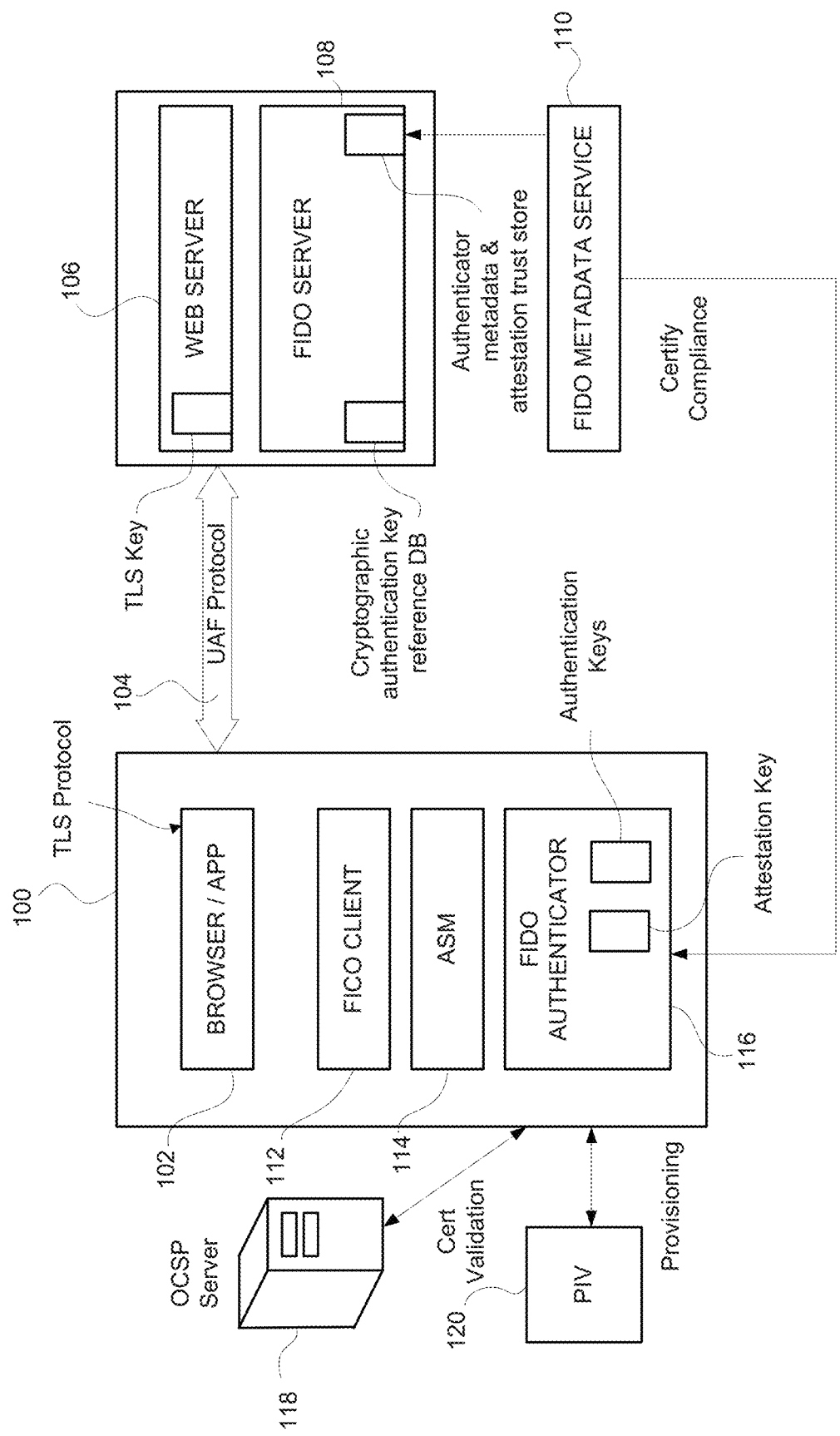
FIG. 1 is a block diagram of a FIDO User Device interacting with the system according to one example of the system.

Referring now to the drawings, wherein like reference numerals designate corresponding structure throughout the views.

FIG. 1 includes a FIDO user device 100 that could include any type of mobile device that includes a browser/app 102 for accessing an online service. The app 102 can be activated to transmit a request having, for example, a UAF protocol 104 that is received by a relying party web server 106. The UAF protocol 104 could comprise a TLS protocol and the relying party web server 106 could comprise a TLS key. While the FIDO UAF protocol is described here and throughout the specification, it will be understood by those of skill in the art that other protocols may effectively be used including, for example, but not limited to U2F protocol and FIDO2 protocol. Additionally, the FIDO2 protocol may comprise Client-to-Authenticator Protocols including CTAP1 or CTAP2.

The relying party web server 106 can then request authentication from a FIDO server 108, which in turn, can send FIDO metadata service 110 that certifies compliance with the FIDO requirements.

Also depicted in FIG. 1 is that the browser/app 102 comprises a FIDO client 112, an authenticator specific module 114 and a FIDO authentication module 116. The FIDO authentication module 116 is, in this example, shown to communicate with Online Certificate Status Protocol (OCSP) server 118 for certificate validation. Optionally, this could comprise validating a DID Document incorporating a DID Identifier by a decentralized architecture such as blockchain, self-sovereign identity and other decentralized assertion models. A difference between PKI and DID is that DID enables verifiable, decentralized digital identity as opposed to a centralized certificate authority. DIDs are URLs that associate a DID subject with a DID document allowing trusted interactions associated with the subject. While PKI is described in connection with a number of the figures and in the specification, it will be understood that DID could also be utilized. DIDs are a type of identifier that enables verifiable, decentralized digital identity. Decentralized Identifiers are a component of larger systems, such as the Verifiable Credentials ecosystem. DIDs are URIs that associate a DID subject with a DID document allowing trustable interactions associated with that subject. Each DID document can express cryptographic material, verification methods, or service endpoints, which provide a set of mechanisms enabling a DID controller to prove control of the DID. Service endpoints enable trusted interactions associated with the DID subject. Diversity of DID systems—DID methods can also be developed for identifiers registered in federated or centralized identity management systems. Indeed, almost all types of identifier systems can add support for DI Ds. This creates an interoperability bridge between the worlds of centralized, federated, and decentralized identifiers.

DID Document Core Properties.

The DID subject is the entity that the DID document is about. That is, it is the entity identified by the DID and described by the DID document.

Controller—An entity that has the capability to make changes to a DID document. A DID may have more than one DID controller. Note that one DID controller may be the DID subject.

Verification Methods—A set of parameters that can be used together with a process or protocol to independently verify a proof. For example, a public key can be used as a verification method with respect to a digital signature; in such usage, it verifies that the signer possessed the associated private key.

Verification Relationships—An expression of the relationship between the DID subject and a verification method.

Service Endpoints—A network address (such as an HTTP URL) at which services operate on behalf of a DID subject.

Figure 1A:
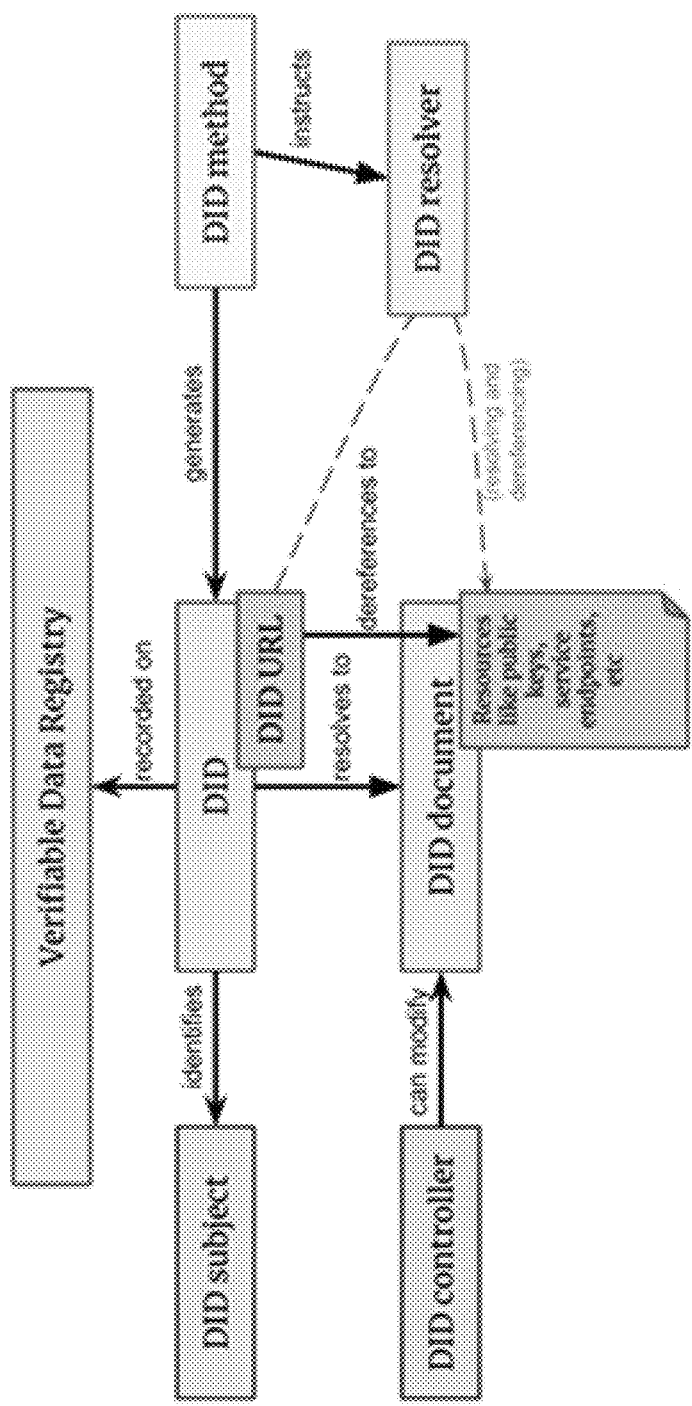
FIG. 1A is a block diagram of the core features of DID, which can be used as the user verification system in connection with FIG. 1.

FIG. 1A illustrates the core components of DID architecture. A DID is a URI composed of three parts: the scheme "did:", a method identifier, and a unique, method-specific identifier generated by the DID method. DIDs are resolvable to DID documents. A DID URL extends the syntax of a basic DID to incorporate other standard URI components (path, query, fragment) in order to locate a particular resource—for example, a public key inside a DID document, or a resource available external to the DID document.

DID Subjects. The subject of a DID is, by definition, the entity identified by the DID. The DID subject may also be the DID controller. Anything can be the subject of a DID: person, group, organization, physical thing, logical thing, etc.

DID Controllers. The controller of a DID is the entity (person, organization, or autonomous software) that has the capability—as defined by a DID method—to make changes to a DID document. This capability is typically asserted by the control of a set of cryptographic keys used by software acting on behalf of the controller, though it may also be asserted via other mechanisms. Note that a DID may have more than one controller, and the DID subject can be the DID controller, or one of them.

Verifiable Data Registries. In order to be resolvable to DID documents, DIDs are typically recorded on an underlying system or network of some kind. Regardless of the specific technology used, any such system that supports recording DIDs and returning data necessary to produce DID documents is called a verifiable data registry. Examples include distributed ledgers, decentralized file systems, databases of any kind, peer-to-peer networks, and other forms of trusted data storage.

DID documents. DID documents contain metadata associated with a DID. They typically express verification methods (such as public keys) and services relevant to interactions with the DID subject. A DID document is represents an abstract data model, and can be serialized according to a particular syntax. The DID itself is the value of the id property. The properties present in a DID document may be updated according to applicable operations.

DID Methods. DID methods are the mechanism by which a particular type of DID and its associated DID document are created, resolved, updated, and deactivated using a particular verifiable data registry.

DID resolvers. A DID resolver is a software and/or hardware component that takes a DID (and associated input metadata) as input and produces a conforming DID document (and associated metadata) as output. This process is called DID resolution.

DID URL dereferencers. A DID URL dereferencer is a software and/or hardware component that takes a DID URL (and associated input metadata) as input and produces a resource (and associated metadata) as output. This process is called DID URL dereferencing.

It will be understood by those of skill in the art that a FIDO certified DPC authenticator forms an important bridge from strongly vetted credentials to FIDO-enabled enterprise server-side resources. As was previously discussed, to date, interoperability of PIV credentials required specific PKI integration of client-side software components and backend CAs. The proposed FIDO DPC Authenticator, will streamline this integration. The DPC implementation creates digital certificates for approved mobile devices, meeting government standards as required by, for example but not limited to, NIST SP 800-157 and NIST SP 800-63-3 AAL3 level and will enable AAL3 authentication utilizing IAL3 identities from mobile devices, meeting government standards as required by, for example but not limited to NIST SP 800-57 and NIST.SP 800-63-3.

Figure 2:
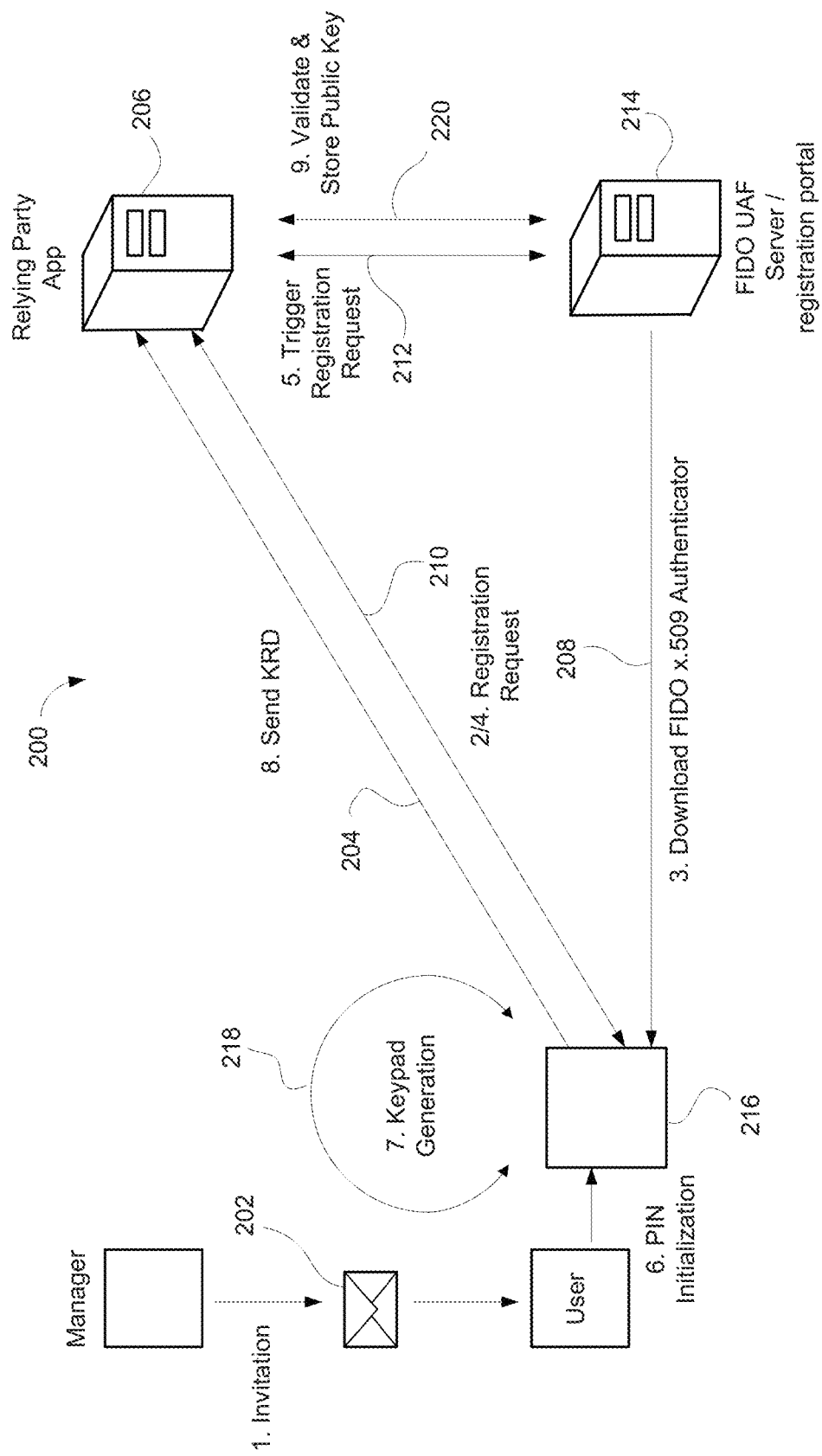
FIG. 2 is a block diagram illustrating obtaining a derived personal identity verification credential.

FIG. 2 illustrates the initial FIDO authenticator registration process 200. In particular, this process shows further includes the optional steps of derived PIV credential provisioning.

In this example, a manager sends and invitation 202 to a user. A registration request 204 is then sent to a relying party app 206, which is then transmitted to a FIDO UAF server/registration portal 214 such that, a FIDO x.509 authenticator is downloaded 208 to the user device.

The user device then sends a registration request 210 to the relying party app 206, which triggers a registration request 212 from the relying party app 206 to the FIDO server/registration portal 214. The FIDO server/registration portal 214 then communicates with the relying party app 206 so contact the user device for PIN initialization 216 and keypair generation 218 occurs.

From this point, the Key Registration Data (KRD) object, which includes Authentication Attestation Identification (AAID), Public Key, Authentication Cryptography and the user name are transmitted to the relying party app 206. The relying party app 206 then communicates with the FIDO server/registration portal 214 to validate and store the public key 220.

Figure 3:
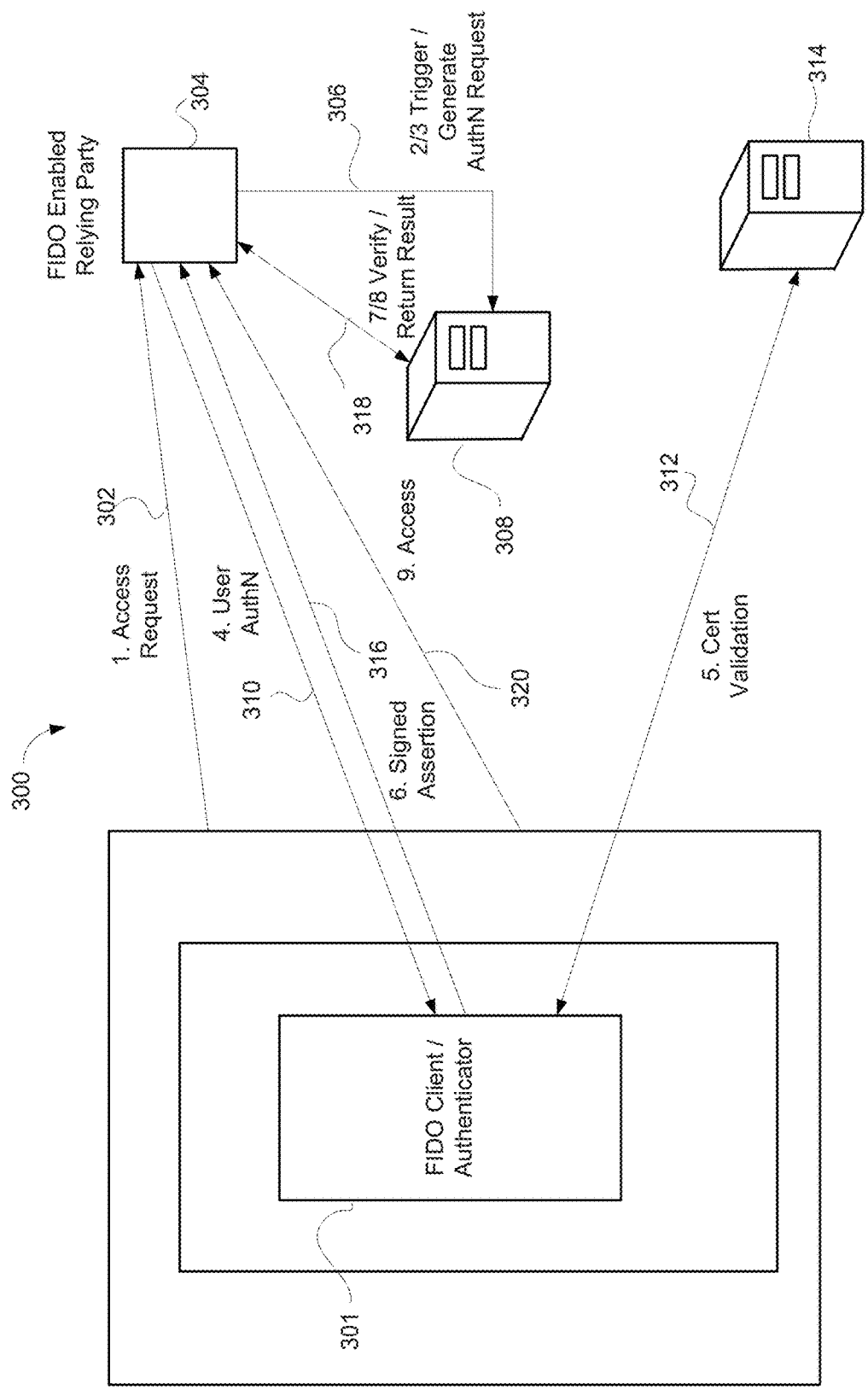
FIG. 3 is a block diagram illustrating the certificate validation process.

FIG. 3 is an example of an authentication system 300. In this example, an access request 302 is generated by an app 301 and is transmitted from a mobile device to a FIDO enabled relying party application 304.

This in turn, triggers a generate authentication request 306 to a FIDO server 308. The authentication request is transmitted to the user device 310 via the relying party application 304. The app 301 sends a certificate validation request 312 to an OCSP server 314 and receives back the validation. The validation or signed assertion 316 is then transmitted to the FIDO enabled relying party application 304. The FIDO enabled relying party application 304 then verifies the result 318 with the FIDO server, and once verified, allows the app 301 to access 320 the FIDO enabled relying party application 304.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Figure 4:
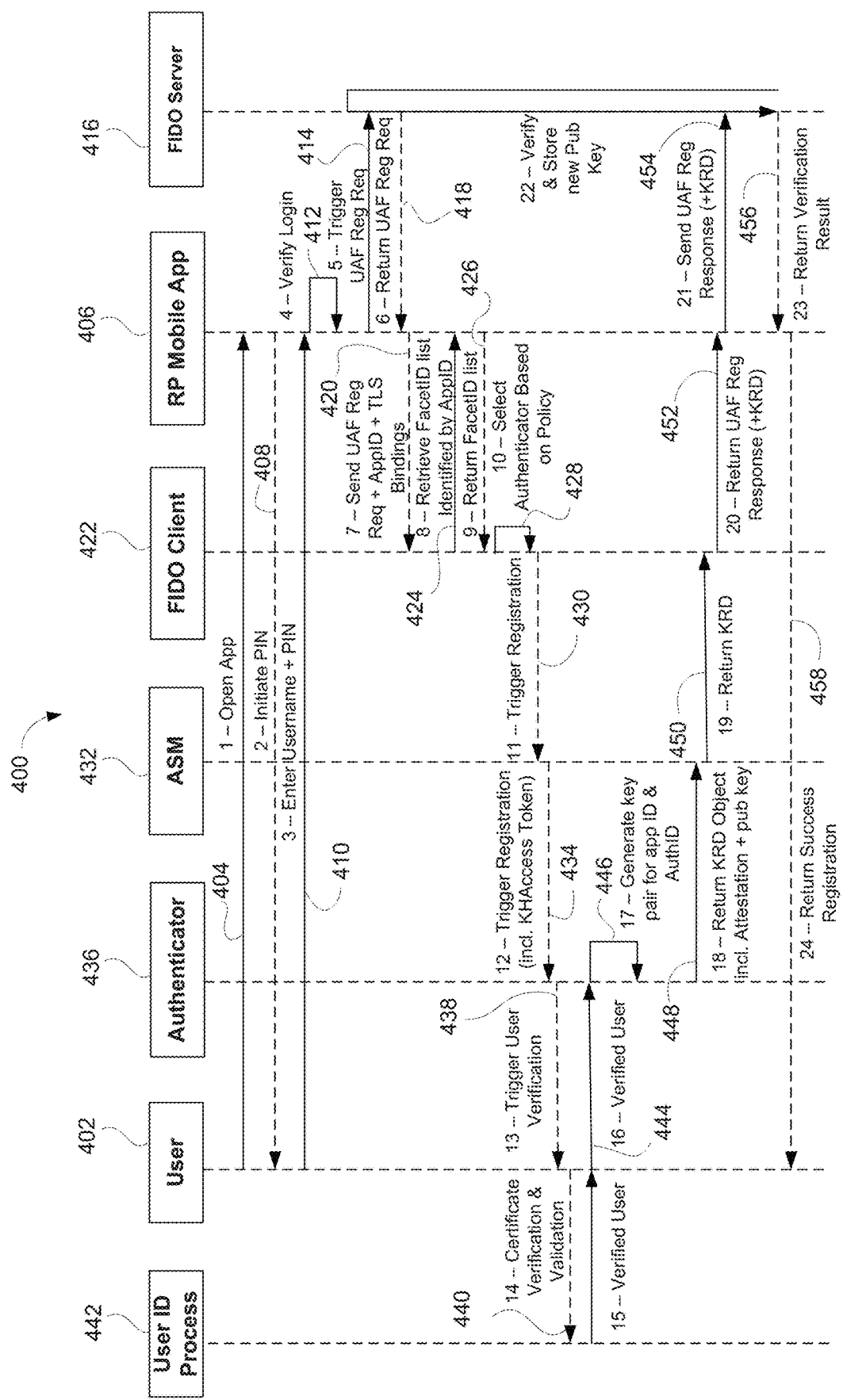
FIG. 4 illustrates a work flow process for FIDO registration of a mobile device with the authentication system.

Turning now to FIG. 4, an example of the FIDO UAF registration 400 process is illustrated. The various steps for registration are depicted including where a user 402 opens 404 a relying party mobile app 406. The mobile app 406 requests the user 402 for a PIN 408 and for the user name and PIN to be submitted 410. The mobile app 406 then verifies the login 412 and triggers a UAF Registration request 414 to a FIDO server 416, which returns the UAF Registration request 418 to the relying party mobile app 406.

The mobile app 406 then sends the UAF Registration request along with the application identification and Transit Layer Security (TLS) bindings 420 to the FIDO client 422, which sends a facet identification list identified by the application identification 424 to the relying party mobile app 406. The relying party mobile app 406 returns the facet identification list 426 to the FIDO client 422, which selects an authenticator based on a policy 428. This in turn, triggers registration 430 from the FIDO client 422 to the Authenticator Specific Module 432. The Authenticator Specific Module 432 triggers registration including a KH Access Token 434 with Authenticator 436. Authenticator 436 triggers user verification 438 with user 402, such that user 402 enters a PIN and sends a certificate verification and validation 440 to the User verification Process 442, which could comprise a PKI process. It should be noted that the authenticator may include without limitation an attestation site or device, a company, a computer-implemented algorithm, a decentralized computing system, or the like.

In one configuration, the User verification Process 442 verifies the user 444, which is sent back to Authenticator 436 for generation of a key pair for the application identification and authentication identification 446.

The Authenticator 436 returns a KRD Object including attestation and public key 448 to the Authenticator Specific Module 432, which in turn, returns the KRD 450 to FIDO client 422. It will be understood that the information has been previously verified to in an attestation or verification transaction stored by a centralized or decentralized service using the address included in the certificate or DID document. The centralized or distributed ledger may provide a record of transactions. The FIDO client 422 returns the UAF registration response including KRD 452 to the relying party mobile app 406, which in turn, sends the UAF registration response including KRD 454 to the FIDO server 416. The FIDO server 416 then returns the verification result 456 to the relying party mobile app 406, which in turn, indicates a successful registration 458 to the user 402.

Figure 4A:
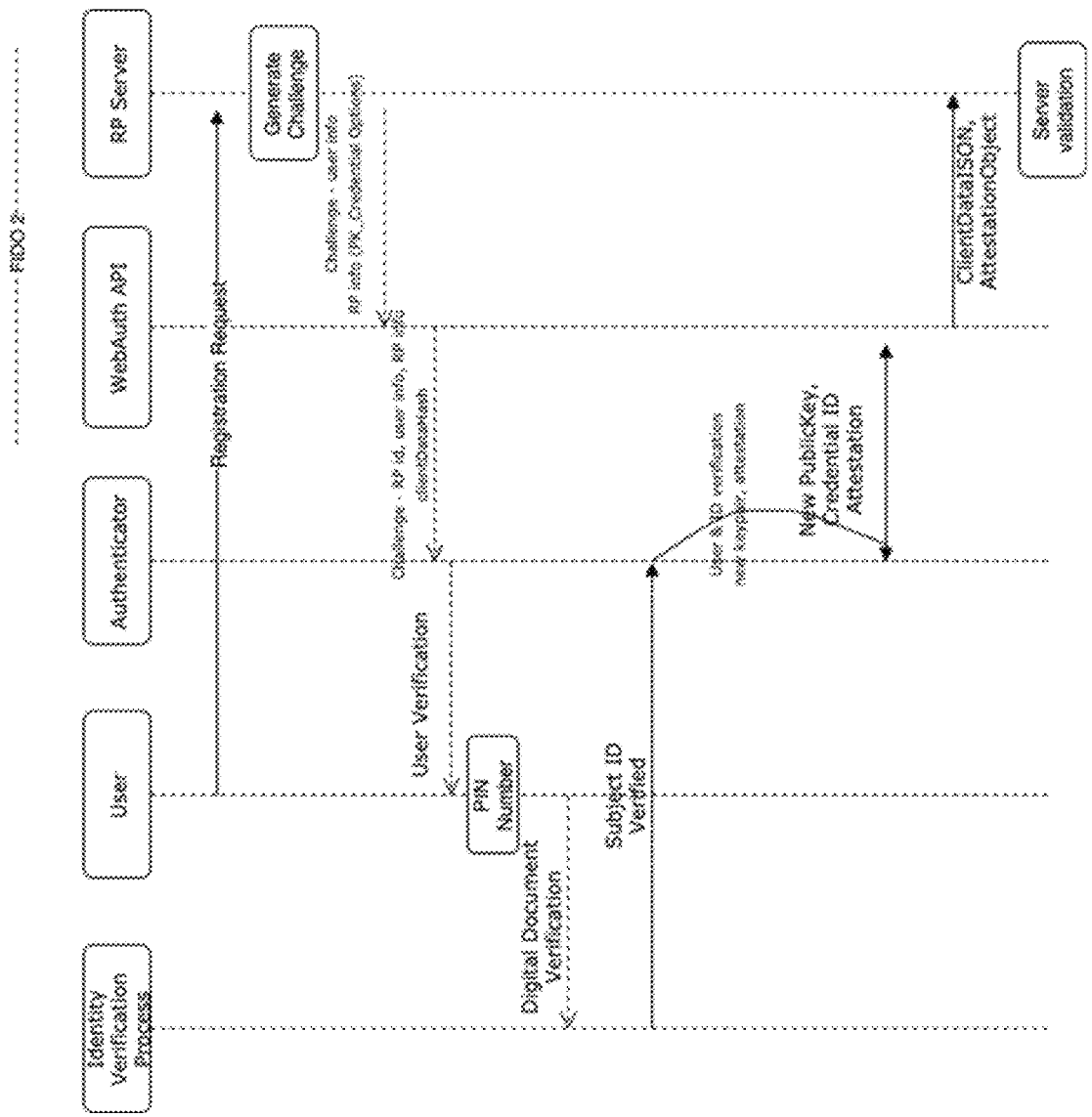
FIG. 4A illustrates a modified work flow process for FIDO2 registration of a mobile device with the authentication system.

FIG. 4A is an alternative to the process that is described in connection with FIG. 4, but illustrates a slightly modified process accounting for the use of FIDO2 protocols.

Figure 5:
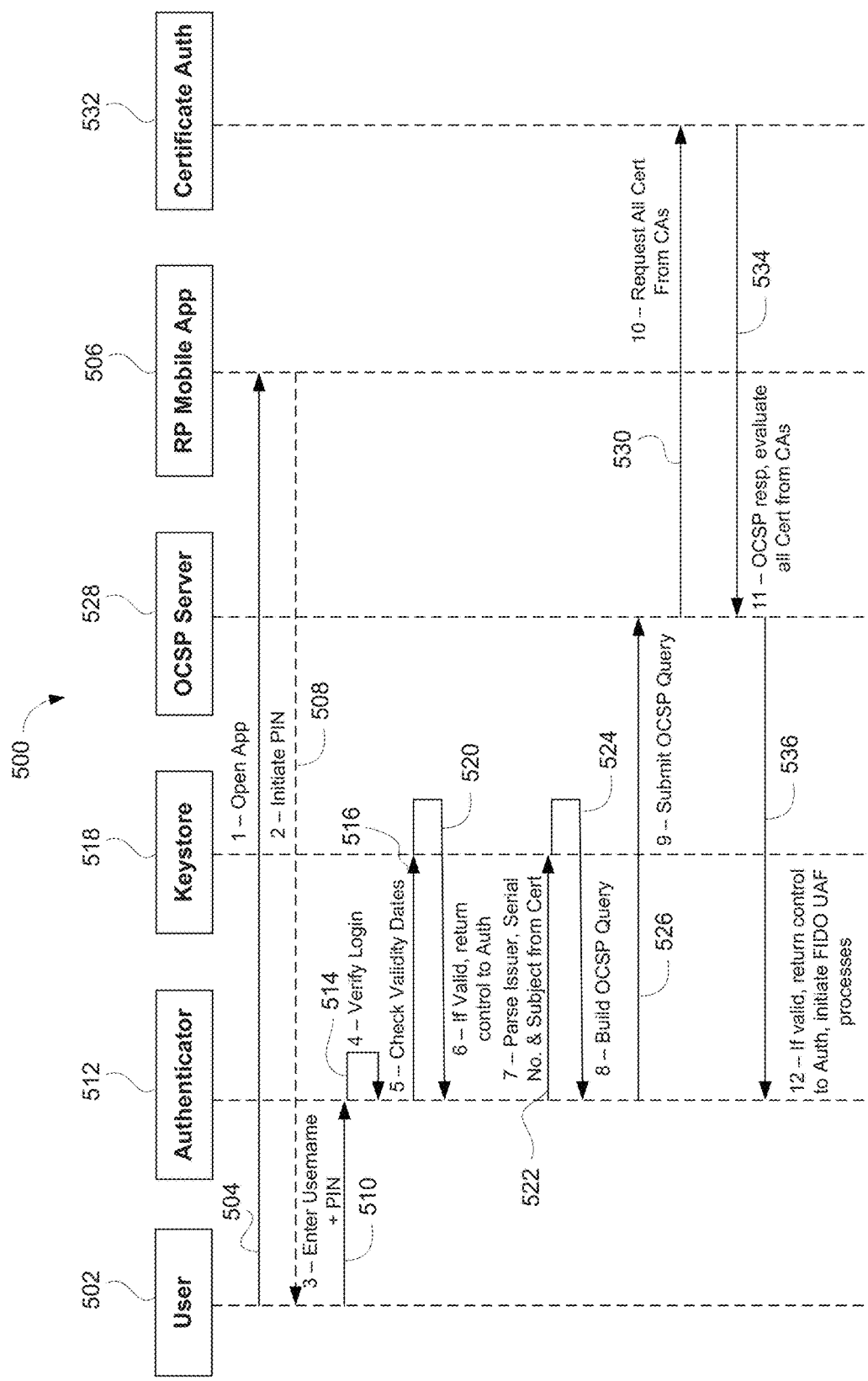
FIG. 5 illustrates a work flow process for OCSP validation of a mobile device with the authentication system.

Turning now to FIG. 5, an example of the OCSP validation process 500 is presented. The various steps for validation are depicted including where a user 502 opens 504 a relying party mobile app 506. The mobile app 506 requests the user 502 to enter a PIN 508. The user 502 enters their user name and PIN 510, which is received by the Authenticator 512. The Authenticator 512 then verifies the login 514 and checks the integrity of the digital document 516 which could include checking the validity of dates, the validity of a public key, the validity of a time stamp, or the validity of a signature algorithm with Keystore 518. If the Keystore 518 confirms validity 520, then control is returned to the Authenticator 512.

The Authenticator 512 then parses the issuer, serial number and subject from the certificate 522 from which the Keystore builds the OCSP query 524. The Authenticator 512 will then submit the OCSP query 526 to the OCSP Server 528. The OCSP Server 528 then requests all certificates 530 from the Certificate Authority 532. The Certificate Authority 532 then sends the certificates for evaluation 534 by the OCSP Server 528. Finally, if the OCSP Server 528 determines that the certificates are valid, then control is returned to the Authenticator for initiation of the FIDO UAF processes 536.

Figure 6:
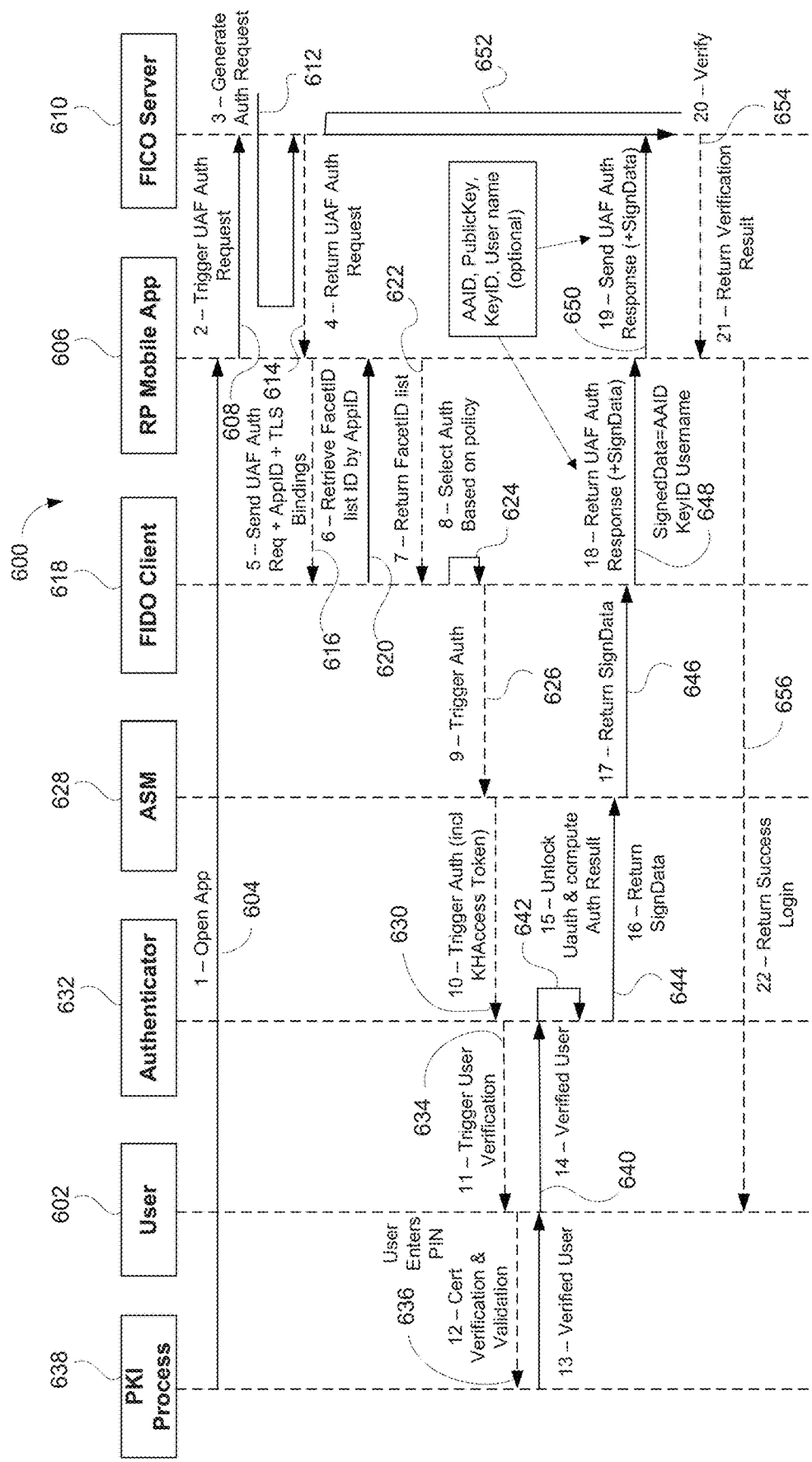
FIG. 6 illustrates a work flow process for FIDO authentication of a mobile device with the authentication system.

Turning now to FIG. 6, an example of the FIDO UAF authentication process 600 is described. The various steps for authentication are depicted including where a User 602 opens 604 a Relying Party Mobile app 606. The Mobile App 606 triggers a UAF authentication request 608, which is sent to FIDO Server 610. A general authorization request 612 is generated and the UAF authentication request is returned 614 to the relying party mobile app 606. The Relying Party Mobile app 606 then sends the UAF authentication request along with the application identification and the TLS bindings 616 to the FIDO Client 618.

The FIDO Client 618 seeks to retrieve the Facet identification list identified by the application identification 620, which request is sent to the Relying Party Mobile app 606. The Relying Party Mobile app 606 then returns the Facet identification list 622 to the FIDO Client 618. The FIDO Client 618 then selects an authenticator based on policy 624, which triggers an authentication 626 to the Authenticator Specific Module 628.

The Authenticator Specific Module 628 then triggers an authentication including a Key Handle (KH) access token 630 with the Authenticator 632. This triggers a user verification 634, such that when the User 602 identifies themselves, a certificate verification and validation request 636 is sent to PKI Process 638. The PKI Process 638 would then send a user verification 640 back to the Authenticator 632.

The Authenticator 632 then unlocks the user authentication and computes the authentication result 642 and sends signed data 644 to the Authenticator Specific Module 628, which in turn, sends the signed data 646 to the FIDO Client 618. The FIDO Client 618 sends a UAF authentication response including the signed data 648 to the Relying Party Mobile App 606.

The Relying Party Mobile App 606 sends the UAF authentication response 650 to the FIDO Server 610, which verifies 652 the UAF authentication response. The verification result is then sent 654 to the Relying Party Mobile App 606, which in turn, provides the login information 656 to the User 602.

Figure 6A:
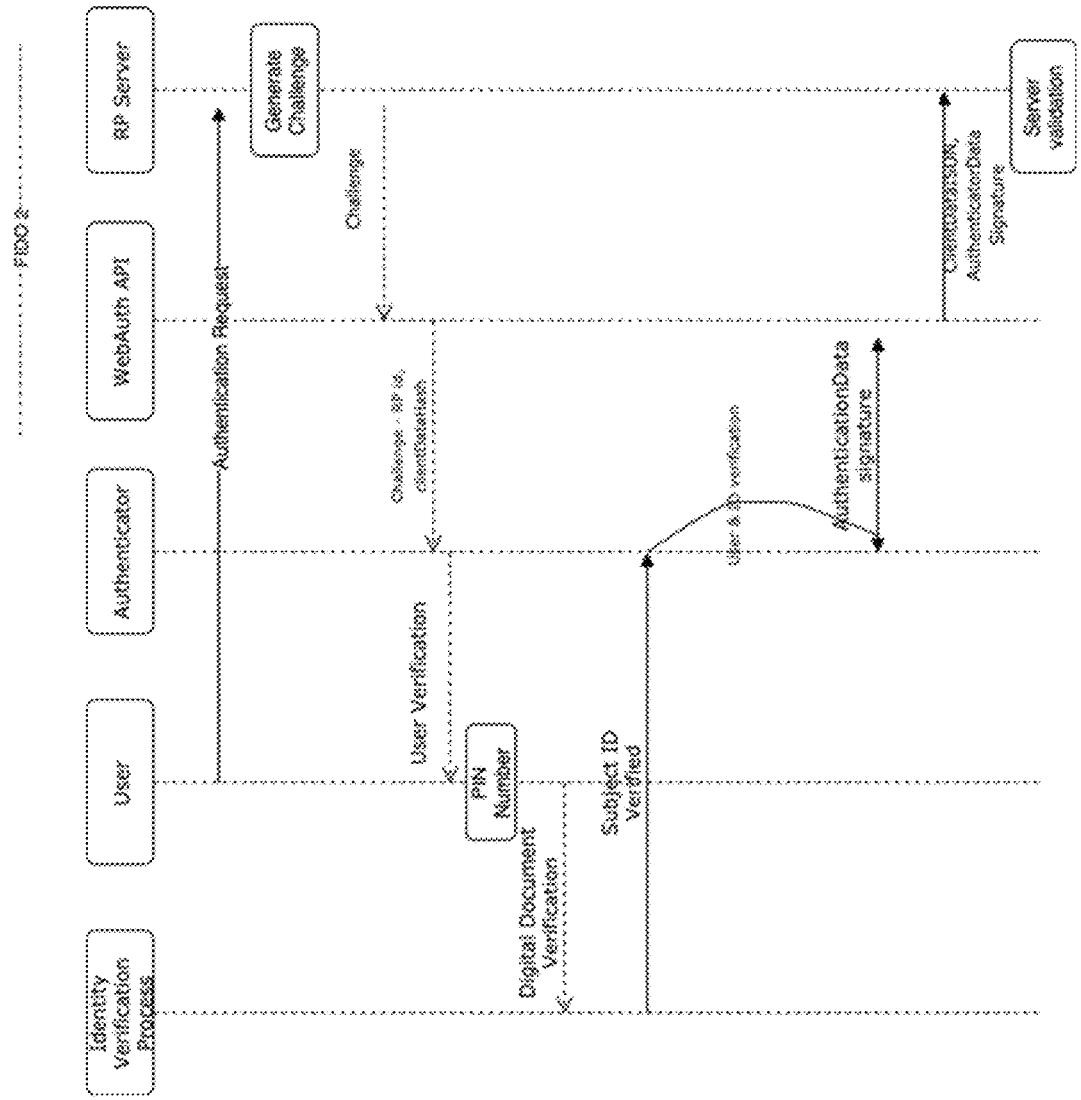
FIG. 6A illustrates a modified work flow process for FIDO2 authentication of a mobile device with the authentication system.

FIG. 6A is an alternative to the process that is described in connection with FIG. 6, but illustrates a slightly modified process accounting for the use of FIDO2 protocols.

Figure 7:
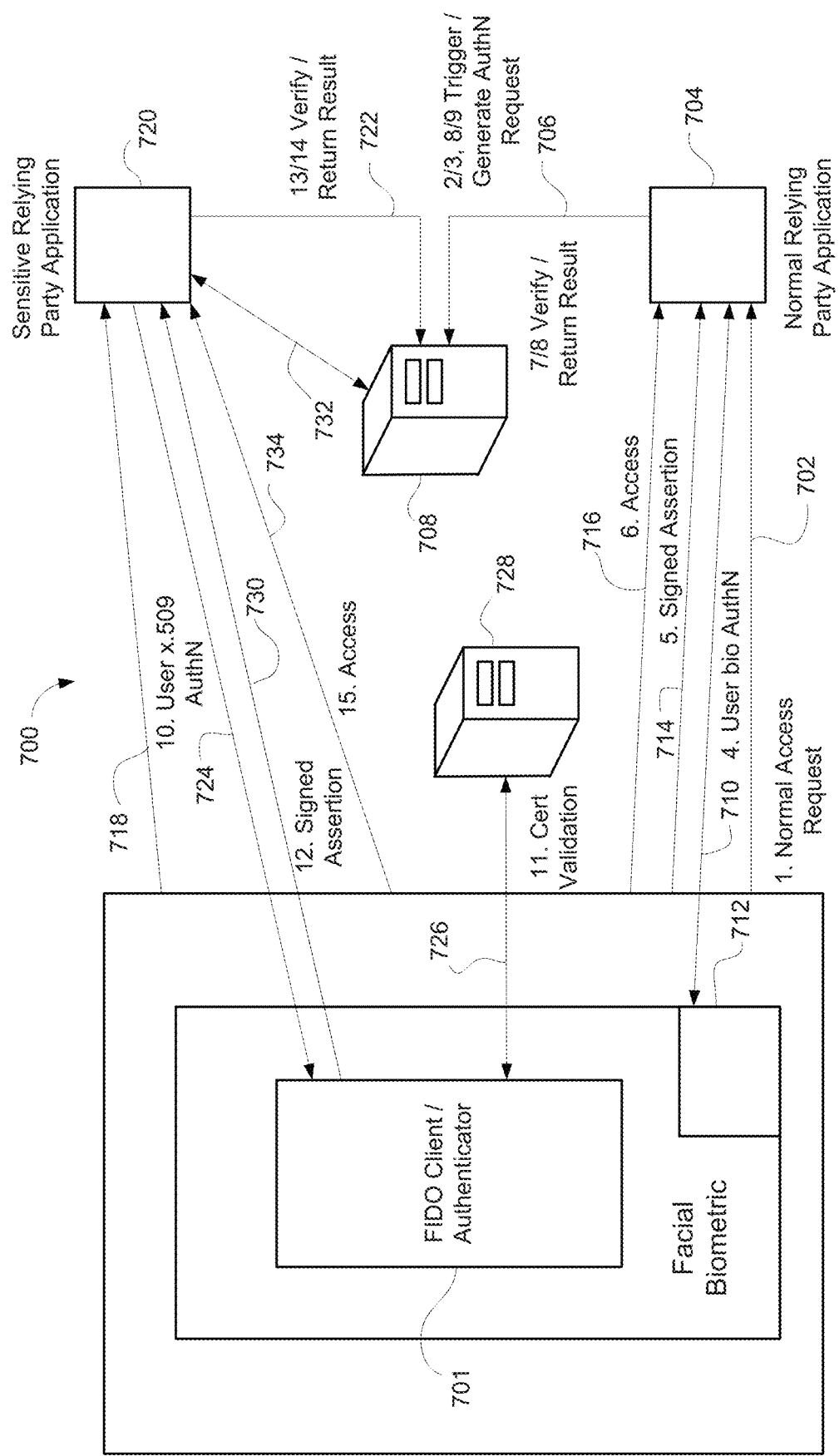
FIG. 7 is a block diagram illustrating FIDO x.509 step-up authentication.

FIG. 7 provides a system for FIDO x.509 step-up authentication. The block diagram is similar to that described in connection with and depicted in FIG. 3, however, this system 700 contemplates a higher level of security may be needed for all applications. In this example, an access request 702 is generated by an app 701 and is transmitted from a mobile device to a FIDO enabled relying party application 704.

This in turn, triggers a generate authentication request 706 to a FIDO UAF server 708. The authentication request is transmitted to the user device 710 via the relying party application 704. In this example, the user needs to input a biometric 712, such as a facial recognition. The signed assertion 714 and access 716 are then sent to the relying party application 704. Additionally, a sensitive access request 718 is sent to a sensitive relying party application 720.

This triggers the generation of a sensitive authority request 722 to the FIDO UAF Server 708. Additionally, an x.509 authentication request 724 is transmitted to the app 701, which requests certificate validation 726 from OCSP Server 728. Once certificate validation is returned from the OSCP server 728, a signed assertion 730 is transmitted to the sensitive relying party application 720.

The sensitive relying party application 720 then verifies the returned results 732 with the FIDO UAF Server 708 after which if the process validates the results, allows access 734 to the sensitive relying party application 720.

Figure 8:
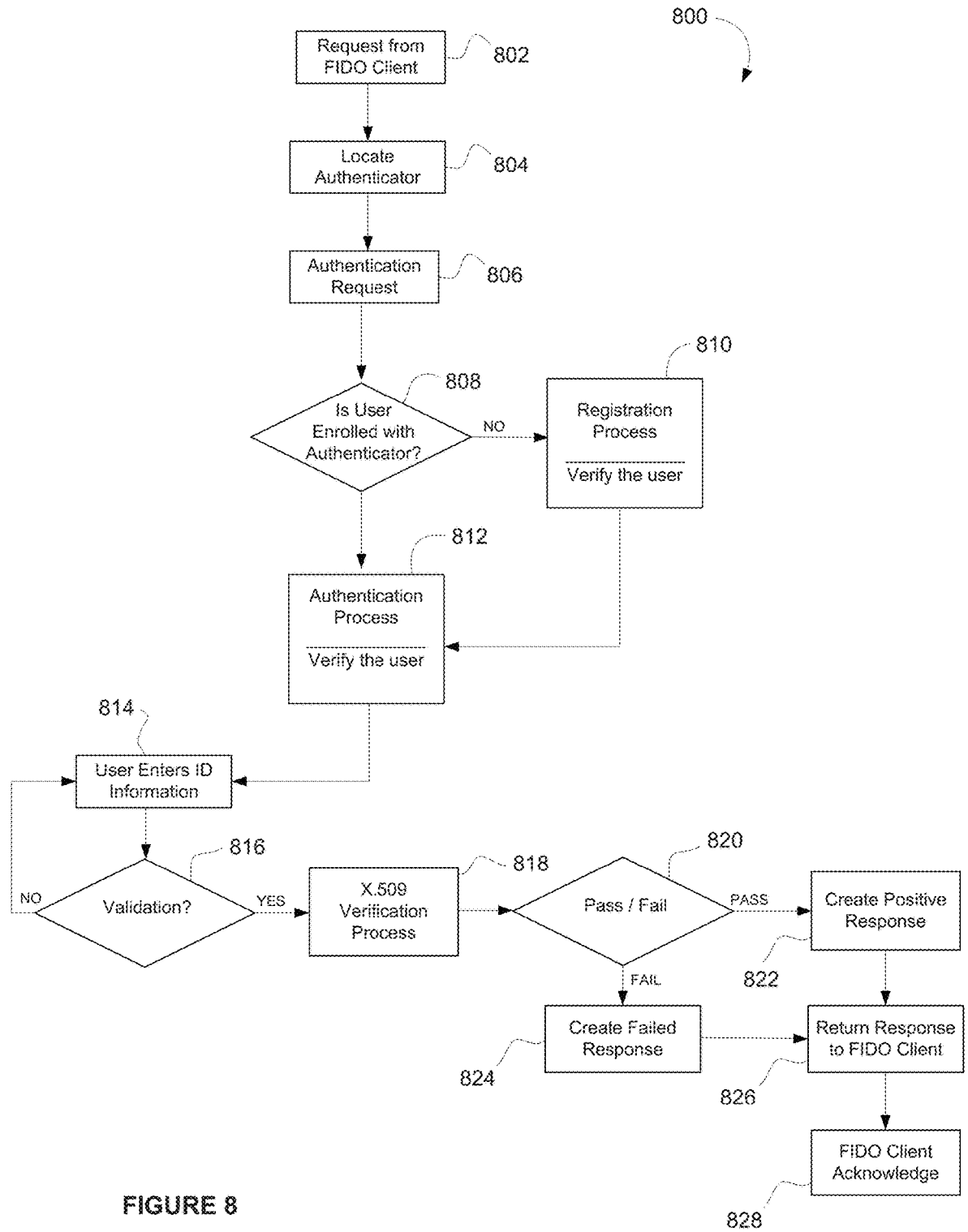
FIG. 8 is a flow diagram showing the authenticator specific module function.

FIG. 8 is a flow diagram showing the authenticator specific module function. The process 800 illustrates the process for a request from a FIDO client 802 to locate the authenticator 804.

The process then moves to authentication request 806, the system will determine if the user is enrolled with authenticator 808. If no, the process moves to user registration process 810; if yes, process moves to authentication process 812.

After the authentication process 812, the process moves to user enters identification information 814. It should be noted that this could be any type of identification that is provided to identify the user. Once the information is input, the process moves to verification 816. If the identity information was not valid, the process loops back to user enters identification information 814, which is will allow for only a limited number of attempts before the process ends. If the identity information was valid, the process moves to a verification process for either an X.509 certificate or DID document 818.

From here the process determines if the x.509 validation passed or failed 820. If the validation passed, the process moves to create a positive response 822; but if the validation failed, the process moves to create a failed response 824. From either a positive or failed response, the process then moves to return the response to the FIDO client 826. Finally, the process progresses to the FIDO client acknowledgement 828.

Figure 9:
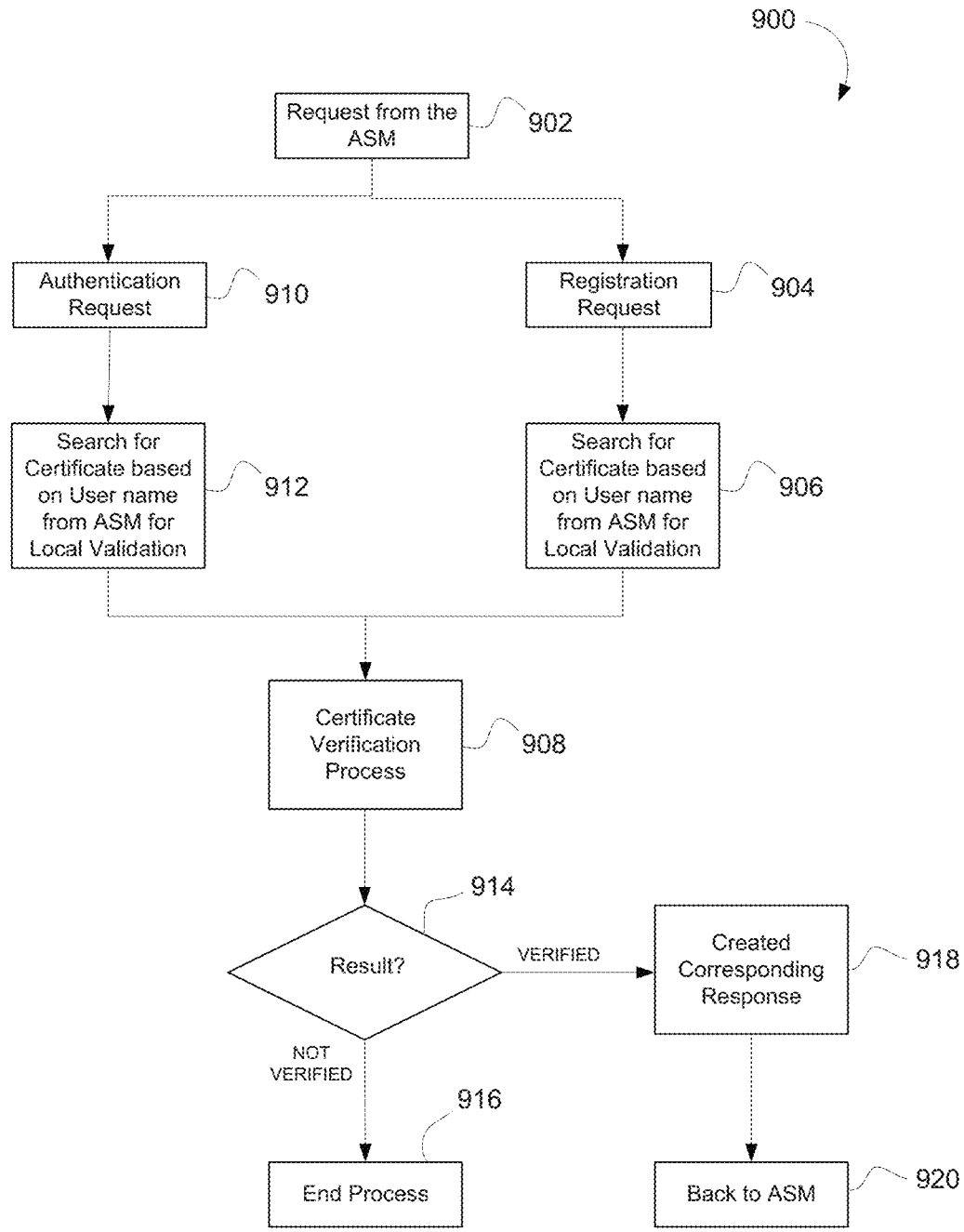
FIG. 9 is a flow diagram showing the authenticator module function.

FIG. 9 is a flow diagram showing the authenticator module function. The process 900 illustrates a request received from the Authenticator Specific Module 902. If a registration request 904 is received, the process proceeds to extract the certificate from the Keystore validation 906. The process then moves to certificate validation process 908.

If an authentication request 910 is received, the process proceeds to search for certificate based on user name from ASM for local validation 912. The process then moves to certificate verification process 908.

From the certificate verification process 908 the result is determined 914. If the result is not verified, the process ends 916. If the process is verified, the process proceeds to create corresponding response 918 and then back to ASM 920.

Figure 10:
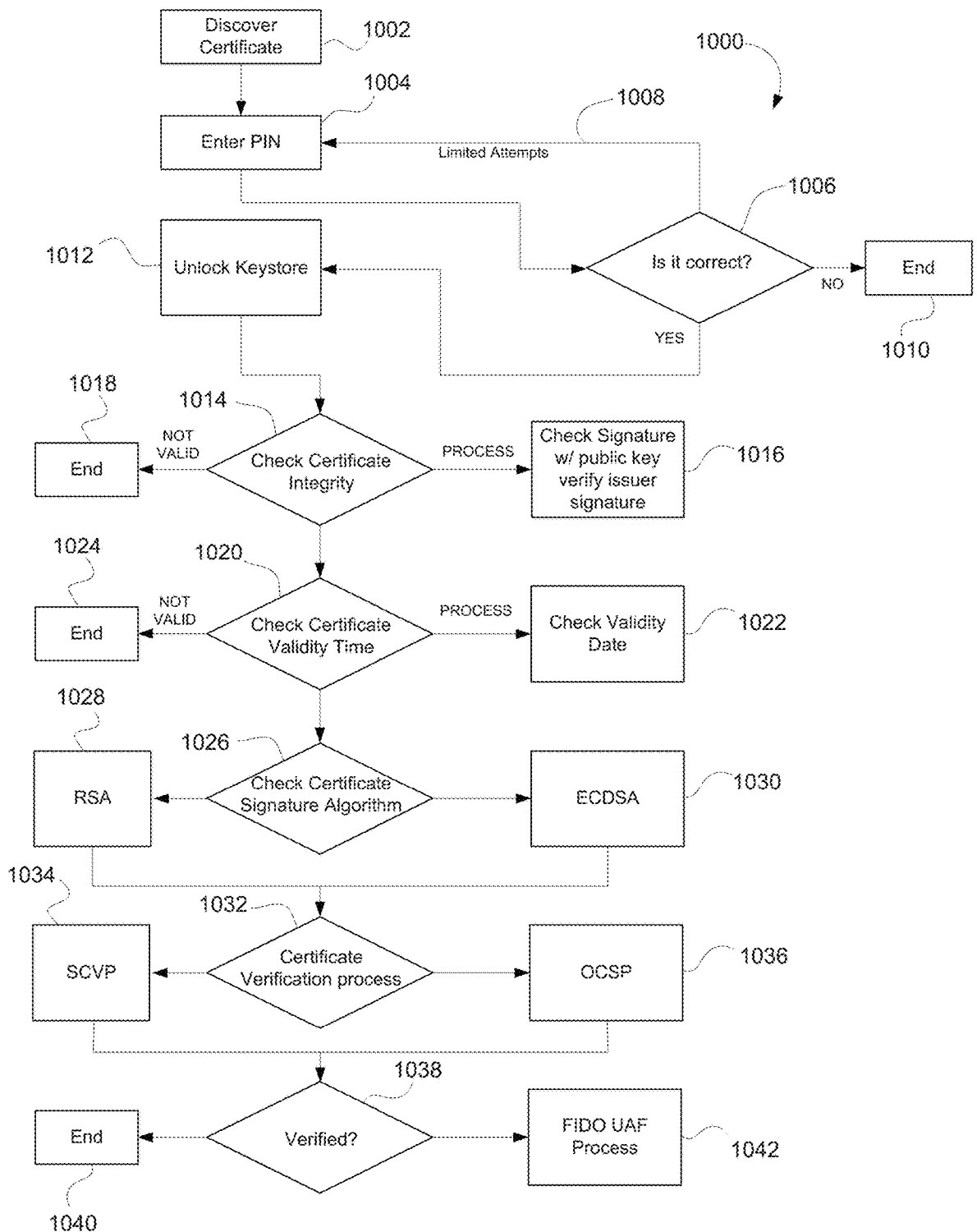
FIG. 10 is a flow diagram showing the Certificate Validation process.

FIG. 10 is a flow diagram showing the certificate verification process. The process 1000 starts with discovering the certificate 1002 and then moves to the user entering a PIN, which could be, for example, a number 6-8 1004. It should be noted that while a PIN is used as an example, any type of security could effectively be used.

The process will then determine if the information entered was correct 1006. If not, the user will be given a limited number of attempts to enter the correct information, such as, for example, being limited to six attempts 1008. If the correct information is not entered within the limited number of attempts, the process will end 1010. If the correct information is entered, the process will move to unlock the Keystore 1012.

After the Keystore is unlocked, the process will proceed to checking the certificate integrity 1014. In checking the certificate integrity, the process will check, for example, the signature with public key and will verify the issuer signature 1016.

If the certificate integrity is determined to be not valid, the process will end 1018. If the certificate integrity is determined to be valid, the process will then move to checking the certificate validity time 1020. In checking the certificate validity time, the process will check, for example, the validity date 1022.

If the certificate integrity is determined to be not valid, the process will end 1024. If the certificate integrity is determined to be valid, the process will then move to checking the certificate signature algorithm 1026. If the checking of the document signature 1026 fails the process ends. In checking the signature algorithm, the process could be checking Rivest-Shamir-Adleman (RSA) 1028, which is an asymmetric cryptographic algorithm or Elliptic Curve Digital Signature Algorithm (ECDSA) 1030.

Once checking the certificate signature algorithm is complete, the process then performs certificate verification process 1032. The certificate verification process, this could include verification of Server Based Certificate Validation (SCVP) 1034 or On-line Certificate Status Protocol (OCSP) 1036.

The process then determines if the certificate is verified 1038. If it is determined that the certificate is not verified, the process ends 1040. If it is determined that the certificate is verified, the process then moves in this example, to the FIDO process 1042.

Figure 11:
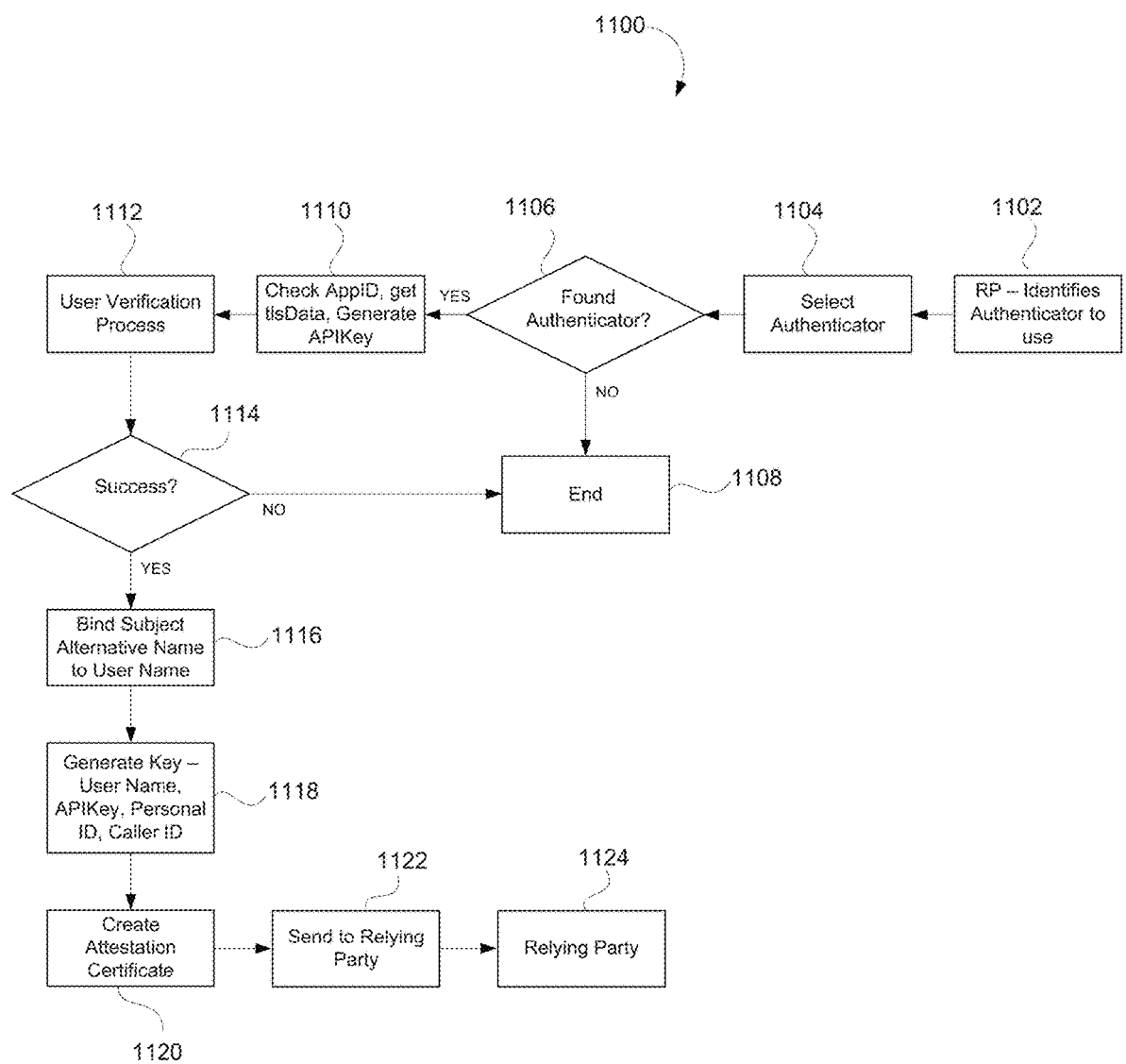
FIG. 11 is a flow diagram showing the Registration process.

FIG. 11 is a flow diagram showing the registration process. The process 1100 begins with the relying party identifies the authenticator to use 1102. From there, the process moves to select the authenticator 1104 and then to determining if the authenticator was found 1106.

If the authenticator was not found, the process ends 1108. If the authenticator was found, the process moves to checking the application identity and generating the API key 1110. Once this is completed, the process moves to the user verification process 1112 and then the process determines whether or not this is successful 1114. If the verification process is not successful, the process ends 1108. If the verification process is successful, the process moves to bind subject alternative name to user name 1116.

This is significant because the system can automatically register the user with the online service with an identity know by a trusted third party. It also eliminates the need for the user to enter a user name during the registration process. It provides a mechanism to leverage one identity (think of a national ID used in Asia). Finally, it binds the digital identity with the Relying Party application.

In step 1116 where the subject alternative name is bound to the user name, part of the issue for a relying party is to have the ability to completely trust the information received during the authentication process, all within the constrains that the authentication protocols require based on the standards that have been adopted. One approach was to link the credential to the authentication protocol (e.g., FIDO). In particular, this process is performed without any input nor awareness of the user.

This process could proceed in one configuration where the authenticator application includes a search routing that looks for a user email address within the user's credentials (e.g., x.509 credentials). The system captures that information and uses it within the authentication protocol to identify the user for the relying party. It is contemplated that, for example, a user email address may reside within a specific field of the x.509 credential, however the issuer may have the option to place it in the field that they deem appropriate. This flexibility requires the system to be able to find it and use that field to link to the authenticating protocol, in this case, the FIDO user name. This information is taken, and the system fills in the field for user name for the relying party. Then the password component is handled by the authentication protocol (FIDO) hiding all of the activity from the user and any other party. All of this activity is happening within the secure container of the device, making it difficult for anyone to break into the process to see the information that is being used or how the authentication application is performing or linking the data from one process to the other.

This procedure allows the following beneficial features:

1. Anti-Phishing. If the user does not know what information is being transmitted to register to a relying party application, the user has no ability to share that information during a phishing or behavior driven attack. Typically, those attacks rely on the user sharing information with a false application, however, because the user does not know what information is within the credential it makes it virtually impossible for a user to share information that they do not have. For example, even if the user knows the user name, the user cannot provide a password as such is generated via the key pair process of the authentication protocol. The PIN number is not linked to the issuance of the keys between the authenticator and the relying party. This achieves much higher security.

2. Relying Party Assurance. By linking the field from the credential that contains the email address that was issued by the credential issuing organization during the PKI identity vetting process, it provides a data point that can be used to verify with the CA. As such, the system delivers reliable authentication verification process as provided, or alternatively, they can inject it into current PKI process for verification.

3. Password-less Authentication. By binding a hidden field of the credential to the relying party, this allows the authenticator to perform a password-less authentication process that can only be activated by the user entering a PIN number that is not shared with anyone (and that PIN number could be replaced or augmented by or with a biometric or other function).

The process then moves to generating the Key 1118, which in one example, may include the user name, API Key, Personal identification and Caller identification. The process then creates an attestation certificate 1120, which is sent 1122 to the relying party 1124.

Figure 12:
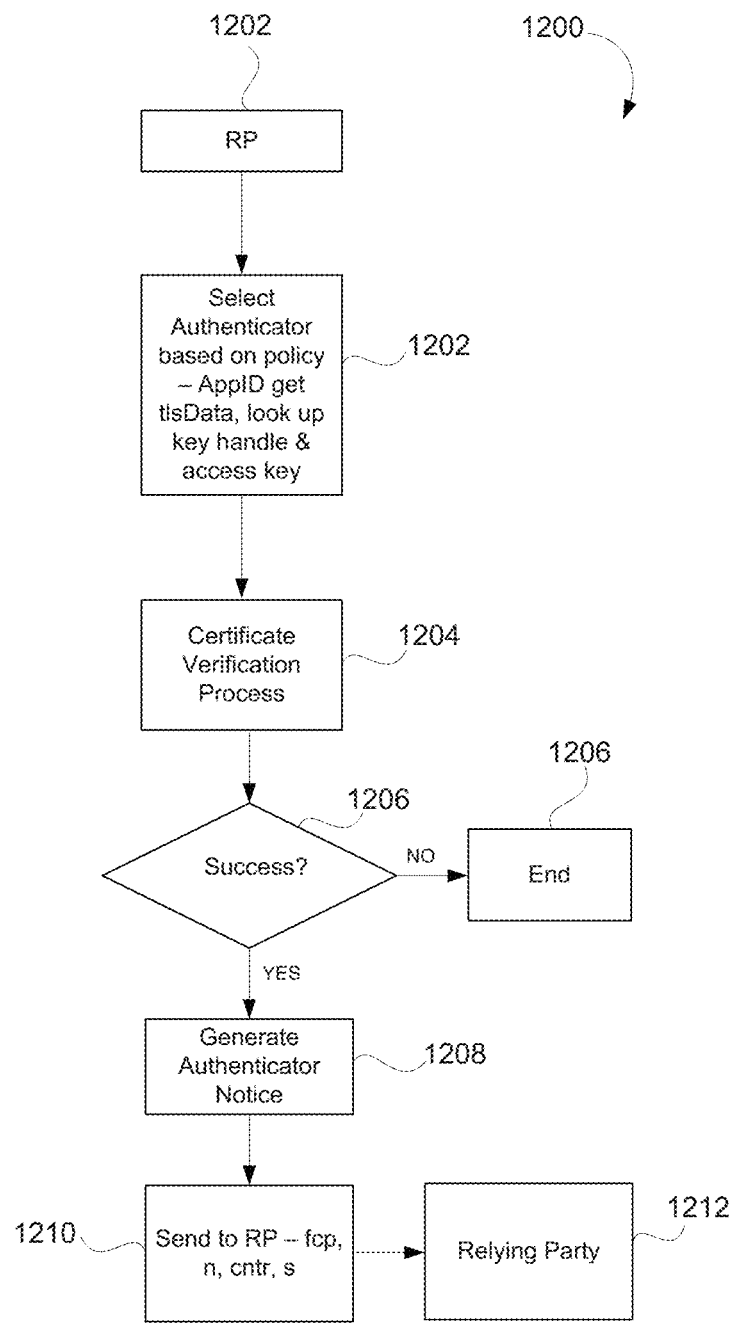
FIG. 12 is a flow diagram showing the Authentication process.

FIG. 12 is a flow diagram showing the authentication process. The process 1200 begins with the relying party 1202 and proceeds to selection of the authenticator based on the policy 1202, which may include the application identification, get tlsData, and look up key handle and access key.

The process then moves to the certificate verification process 1204 where the system determines if the validation was a success 1206. If not, the process ends 1207. If the validation is successful, the process moves to generation of authenticator notice 1208.

The process then sends final challenge parameters (fcp), result n (Yes or No), counter (cntr), signature (s) 1210 to the relying party 1212.

In comparing the present system with the known prior art, some of the many benefits of MAIDC include:

1) Increased DPC value and use. The system provides the ability to connect mobile devices via FIDO DPC authenticator to enterprise resources. The system also extends the use of the DPC into commercial activities, which functions to preserve privacy and certificate information.

2) Enhanced security and privacy. The system reduces or eliminates the use of weak username/password authentication mechanisms. It also provides anonymized authentication without losing the strength of the certificate, by decoupling personal information from the authentication event. The system further decreases the likelihood of a social engineering attack via password reset requests.

3) Lower operations costs. The current system functions to extend the current investments made on the PIV certification process into mobile devices. It reduces security operational cost in that, by reducing the use of a password it will reduce the number of password reset calls into the helpdesk.

Still further, the proposed FIDO DPC Authenticator will facilitate rapid development and integration of mobile authentication into government and private sector systems. One of the limitations of FIDO is the inability to directly integrate with trusted identity verification systems. This results in the inability to directly use centralized or decentralized verifiable identification credentials with AA3 level authentication provided by FIDO. However, the MAIDC solves that problem as it is the only system that joins certificate credentials on mobile devices to FIDO enabled backend services. The bridging of identity verification with FIDO's strong device authentication significantly enhances trust from a mobile device.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for peer-to-peer authentication of a user with a mobile device to an online service server via a network connection based on reliable information about the user and the mobile device, the system comprising:
    a memory and a processor;
    a software executing on the mobile device transmitting an authentication request to the online service server via a network connection;
    said online service server transmitting data relating to the authentication request to a Fast Identity Online (FIDO) authentication system via the network connection;
    said software executing on the mobile device receiving an authentication request from the FIDO authentication system via the network connection;
    said software executing on the mobile device retrieving information associated with a digital document comprising data related to the user and stored on the mobile device, the digital document generated via a user verification system;
    wherein the retrieved information is selected from the group consisting of: a field from the digital document, a user verification system digital signature, a user name, an email address, an expiration date, data about rights and uses associated with the digital document, a name of the verification system that generated the digital document, an algorithm identifier that identifies an algorithm that was used to sign the digital document and combinations thereof;
    said software executing on the mobile device for validating the integrity of the digital document; and
    said software executing on the mobile device inserting at least some of the retrieved information into an authentication message and transmitting the authentication message to the FIDO authentication system.

2. The system according to claim 1, wherein the user verification system is selected from the group consisting of: Public Key Infrastructure (PKI) or Decentralized Identity (DID).

3. The system according to claim 2, wherein when the user verification system is selected to be PKI the digital document comprises a x.509 certificate.

4. The system according to claim 3, further comprising,
    said software executing on the mobile device transmitting the retrieved information to the user verification system; and
    said user verification system transmitting a verification to the mobile device that the retrieved information is verified.

5. The system according to claim 4, wherein the user verification system comprises a certificate authority.

6. The system according to claim 2, wherein when the user verification system is selected to be DID, the digital document comprises a DID document generated by a Decentralized Identity system.

7. The system according to claim 6, further comprising,
    said software executing on the mobile device transmitting the retrieved information to the user verification system; and
    said user verification system transmitting an attestation to the mobile device that the retrieved information is verified.

8. The system according to claim 7, wherein the verification of the retrieved information is done via a service end point to a verifiable data registry.

9. The system according to claim 8, wherein the verifiable data registry is selected from the group consisting of: a distributed ledger, a decentralized file system, a database, a peer-to-peer network and combinations thereof.

10. The system according to claim 1, wherein the authentication message includes information relating to the validation of the integrity of the digital document.

11. The system according to claim 1, wherein the online service server stores at least some of the data related to the user on a storage accessible by the online service server.

12. The system according to claim 1, wherein the FIDO authentication system conforms to UAF protocol, U2F protocol, FIDO2 protocol and combinations thereof.

13. The system according to claim 12, wherein the FIDO2 protocol comprises Client-to-Authenticator Protocols including CTAP1 or CTAP2.

14. The system according to claim 1, wherein validation of the integrity of the digital document includes analyzing: a public key, or a validity date, or a verifiable time stamp, or a certificate signature algorithm or a digital signature of the document or combinations thereof.

15. The system according to claim 1, wherein the transmitting of the authentication message is contingent upon the validation of the integrity of the digital document.

16. The system according to claim 15, wherein the validation of the integrity of the digital document includes determining whether the electronic document has been altered or compromised.

17. The system according to claim 1, wherein the software for validating the integrity of the digital document is provided to determine whether the digital document has been modified or transmit the digital document to the user verification system to determine if the digital document has been modified, or transmit the digital document or a portion thereof to the user verification system to determine if the data contained within the digital document is valid, and combinations thereof.

18. The system according to claim 1, wherein the authentication request comprises a registration request for registering the mobile device with the online service server and includes the retrieved information about the user from the digital document.

19. The system according to claim 18, wherein said data transmitted from said online service server to the FIDO authentication system comprises data relating to the registration request,
wherein said registration request is based on a public-private key pair; and
wherein said authentication message comprises a registration message that includes information about the user retrieved from the digital document and is based on the public-private key pair and at least some of the user information is stored and accessible by the online service server.

20. The system according to claim 1, wherein the authentication message further includes information about the mobile device.

21. A method for peer-to-peer authentication of a user and a mobile device to an online service server via a network connection based on reliable information about the user and the mobile device, the method comprising the steps of:
transmitting information about the user from the mobile device to a user verification system via a network connection;
receiving at the mobile device a digital document generated via a user verification system and containing information about the user from the user verification system;
transmitting an authentication request from the mobile device to the online service server via a network connection;
transmitting data relating the authentication request from the online service server to a Fast Identity Online (FIDO) authentication system via a network connection;
receiving at the mobile device an authentication request from the FIDO authentication system;
retrieving information associated with the user from the digital document stored on the mobile device;
wherein the retrieved information is selected from the group consisting of: a field from the digital document, a user verification system signature, a user name, an email address, an expiration date, data about rights and uses associated with the digital document, a name of the verification system that generated the digital document, an algorithm identifier that identifies an algorithm that was used to sign the digital document and combinations thereof;
validating the integrity of the digital document; and
inserting at least some of the retrieved information into an authentication message and transmitting the authentication message to the FIDO authentication system.

22. The method according to claim 21, wherein the user verification system is selected from the group consisting of: Public Key Infrastructure (PKI) or Decentralized Identifier (DID).

23. The method according to claim 22, wherein when the user verification system is selected to be PKI the digital document is a x.509 certificate.

24. The method according to claim 23, further comprising the steps of:
transmitting the retrieved information from the mobile device to the user verification system; and
transmitting a verification from the user verification system to the mobile device that the retrieved information is verified.

25. The method according to claim 24, wherein the user verification system comprises a certificate authority.

26. The method according to claim 22, wherein when the user verification system is selected to be DID, the digital document comprises a DID document generated by a Decentralized Identity system.

27. The method according to claim 26, further comprising the steps of:
transmitting the retrieved information from the mobile device to the user verification system; and
transmitting an attestation from the user verification system to the mobile device that the retrieved information is verified.

28. The method according to claim 27, wherein the verification of the retrieved information is done via a service end point to a verifiable data registry.

29. The method according to claim 28, wherein the verifiable data registry is selected from the group consisting of: a distributed ledger, a decentralized file system, a database, a peer-to-peer network and combinations thereof.

30. The method according to claim 21, wherein the authentication message includes information relating to the validation of the integrity of the digital document.

31. The method according to claim 21, wherein the FIDO authentication system conforms to UAF protocol, U2F protocol, FIDO2 protocol and combinations thereof.

32. The method according to claim 31, wherein the FIDO2 protocol comprises Client-to-Authenticator Protocols including CTAP1 or CTAP2.

33. The method according to claim 21, wherein the step of validating the integrity of the digital document includes analyzing: a public key, or a validity date, or a verifiable time stamp, or a certificate signature algorithm or combinations thereof.

34. The method according to claim 21, wherein the transmitting of the authentication message is contingent upon the step of validating the integrity of the digital document.

35. The method according to claim 34, wherein the validation of the integrity of the digital document includes determining whether the electronic document has been altered or compromised.

36. The method according to claim 21, wherein the step of validating the integrity of the digital document further comprises the step of: determining whether the digital document has been modified, or transmitting the digital document to the user verification system to determine if the digital document has been modified, or transmitting the digital document or a portion thereof to the user verification system to determine if the data contained within the digital document is valid, and combinations thereof.

37. The method according to claim 21, wherein the authentication request comprises a registration request for registering the mobile device with the online service server and includes the retrieved information about the user from the digital document.

38. The method according to claim 37, wherein the data transmitted from the online service server to the FIDO authentication system comprises data relating to the registration request,
wherein said registration request is based on a public-private key pair; and
wherein said authentication message comprises a registration message that includes information about the user retrieved from the digital document and is based on the public-private key pair and at least some of the user information is stored and accessible by the online service server.

39. The method according to claim 21, further comprising the step of:
storing at least some of the data related to the user on a storage associated with the online service server.

40. The method according to claim 21, further comprising the step of inserting information about the mobile device into the authentication message.

* * * * *